United States Patent
Ozawa

(10) Patent No.: US 9,077,931 B2
(45) Date of Patent: Jul. 7, 2015

(54) INFORMATION REGISTRATION SYSTEM

(75) Inventor: Kazuaki Ozawa, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 2072 days.

(21) Appl. No.: 12/062,578

(22) Filed: Apr. 4, 2008

(65) Prior Publication Data

US 2009/0074233 A1 Mar. 19, 2009

(30) Foreign Application Priority Data

Sep. 18, 2007 (JP) .................................. 2007-241377

(51) Int. Cl.
*G06K 9/00* (2006.01)
*H04N 1/44* (2006.01)
*G06F 21/60* (2013.01)

(52) U.S. Cl.
CPC ............ *H04N 1/4406* (2013.01); *G06F 21/608* (2013.01); *G06F 2221/2153* (2013.01)

(58) Field of Classification Search
CPC ....... G06F 21/608; G06F 21/32; G06F 21/34; G06F 2221/2153; H04N 2201/0094; H04N 2201/3205
USPC .......................... 382/100, 115, 116, 124, 125
See application file for complete search history.

(56) References Cited

U.S. PATENT DOCUMENTS

| | | | | |
|---|---|---|---|---|
| 5,857,024 A * | 1/1999 | Nishino et al. | ................ | 713/172 |
| 6,765,470 B2 * | 7/2004 | Shinzaki | ...................... | 340/5.52 |
| 7,406,611 B2 * | 7/2008 | Takahashi et al. | ............ | 713/300 |
| 7,430,306 B1 * | 9/2008 | Osborn et al. | ................ | 382/115 |
| 7,646,425 B2 * | 1/2010 | Bohaker et al. | ............... | 348/373 |
| 2004/0249765 A1 * | 12/2004 | Leon | ................................ | 705/64 |
| 2005/0219610 A1 * | 10/2005 | Kimura et al. | ............... | 358/1.15 |
| 2005/0254070 A1 * | 11/2005 | Sayama | ......................... | 358/1.1 |
| 2005/0264846 A1 * | 12/2005 | Tsuzuki | ....................... | 358/1.18 |
| 2007/0078782 A1 * | 4/2007 | Ono et al. | ....................... | 705/67 |

FOREIGN PATENT DOCUMENTS

JP 2006-004047 A 1/2006
JP 2006-340398 A 12/2006

* cited by examiner

*Primary Examiner* — Kim Vu
*Assistant Examiner* — Michael Vanchy, Jr.
(74) *Attorney, Agent, or Firm* — Sughrue Mion, PLLC

(57) ABSTRACT

A memory device memorizes, in association, possessor identification information, which is recorded at recording mediums carried by authorized users of an image forming device, and inputter identification information corresponding to the possessor identification information. An information retention device memorizes image information and inputter identification information transmitted from an image formation instruction device. A reading device reads possessor identification information from a recording medium. If it is determined that this possessor identification information has been memorized at the memory device, an image formation section reads image information that is associated with inputter identification information that is associated with the possessor identification information, and implements image formation. If not, an output section outputs the possessor identification information. When the possessor identification information is inputted through an input section, a registration section registers the possessor identification information and inputter identification information by memorizing them in association at the memory device.

14 Claims, 21 Drawing Sheets

FIG. 4

| POSSESSOR IDENTIFICATION INFORMATION | INPUTTER IDENTIFICATION INFORMATION |
|---|---|
| Fx12345-001 | ---- Taro-Fuji |
| Fx224143-002 | ---- Hanako-Fuji |
| Fx22286-001 | ---- Kazuaki-Ozawa |
| ⋮ | ⋮ |

```
FILENAME: REGISTRATION REQUEST.TXT
INPUTTER IDENTIFICATION
       INFORMATION: Kazuaki-Ozawa
             CODE: afa24qbaC
```

FIG. 11

```
NEW CARD REGISTRATION SHEET

CODE: afa24qbaC
REGISTRATION EXPIRES: 2007/3/28
```

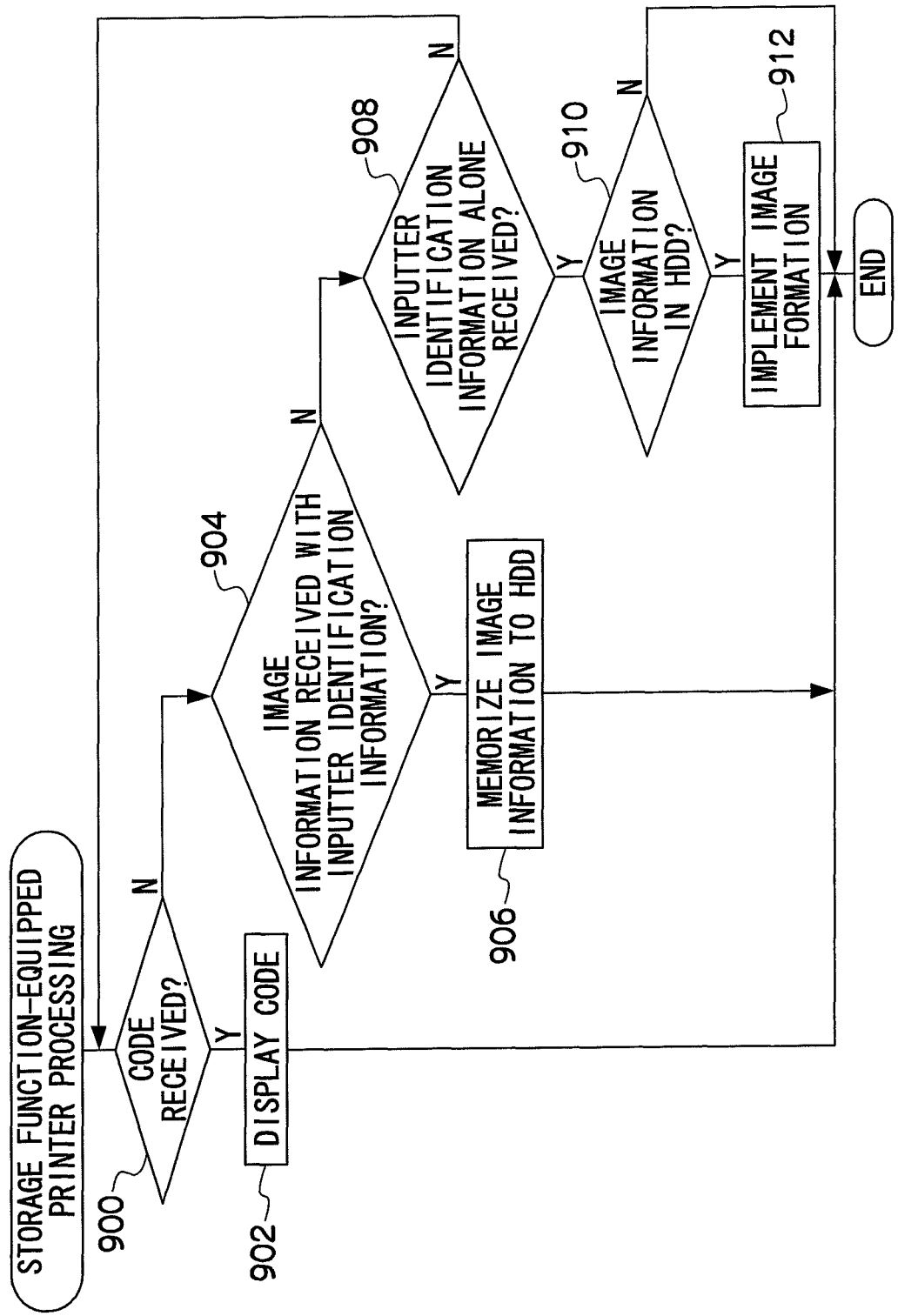

INFORMATION REGISTRATION SYSTEM

CROSS-REFERENCE TO RELATED APPLICATION

This application is based on and claims priority under 35 USC 119 from Japanese Patent Application No. 2007-241377 filed Sep. 18, 2007.

BACKGROUND

1. Technical Field

The present invention relates to an information registration system.

2. Related Art

A technology is known in which, when an image forming device such as a printer, a fax machine or the like is to form an image represented by image information inputted from an external device, authentication information is inputted, and the image formation is performed only if the inputted authentication information has received authentication from a person who inputted the image information.

SUMMARY

In consideration of the above circumstances, the present invention provides an information registration system.

According to an aspect of the invention, there is provided an information registration system including: an image forming device that forms an image represented by image information; a recording medium at which possessor identification information for identifying a person who possesses the recording medium is pre-recorded; a reading device that reads the possessor identification information from the recording medium; an image formation instruction device including an input section for inputting transmission instruction information, which instructs a transmission of the image information representing the image that is to be formed by the image forming device, and the possessor identification information, and a transmission section that, when the transmission instruction information is inputted through the input section, transmits the image information together with inputter identification information for identifying a person who inputs information; a memory device that memorizes, in association, the possessor identification information recorded at the recording medium, which is carried by an authorized user who is authorized to use the image forming device, and the inputter identification information that corresponds to the possessor identification information; an information retention device including a reception section that receives the image information and the inputter identification information transmitted by the transmission section, and a memory that temporarily memorizes the image information and the corresponding inputter identification information received by the reception section in association with one another; a determination section that determines whether or not the possessor identification information read by the reading device has been memorized at the memory device; an image formation section that, if it is determined by the determination section that the possessor identification information has been memorized at the memory device, reads from the memory the image information that is associated with the inputter identification information that is associated in the memory device with the possessor identification information, and implements image formation by the image forming device in accordance with the image information; an output section that, if it is determined by the determination section that the possessor identification information has not been memorized at the memory device, outputs the possessor identification information; and a registration section that, when the possessor identification information is inputted through the input section, registers the possessor identification information and the inputter identification information by memorizing the possessor identification information and the inputter identification information in association at the memory device.

BRIEF DESCRIPTION OF THE DRAWINGS

Exemplary embodiments of the present invention will be described in detail based on the following figures, wherein:

FIG. 4 is a schematic view showing an example of possessor identification information and inputter identification information which are memorized in an HDD relating to the first exemplary embodiment.

FIG. 8 is a schematic view showing an example of an electronic file which is transmitted from a client device relating to the first exemplary embodiment.

FIG. 11 is a view showing an example of a mode in which a code and associated information are displayed on a recording paper by the printer with the storage function relating to the first exemplary embodiment.

FIG. 21 is a flowchart showing a flow of processing of a processing program of a printer with a storage function relating to the third exemplary embodiment.

DETAILED DESCRIPTION

Herebelow, a best mode for embodying the present invention will be described in detail with reference to the drawings. In the following, a case in which the present invention is applied to a printer system will be described.

Figure 1:
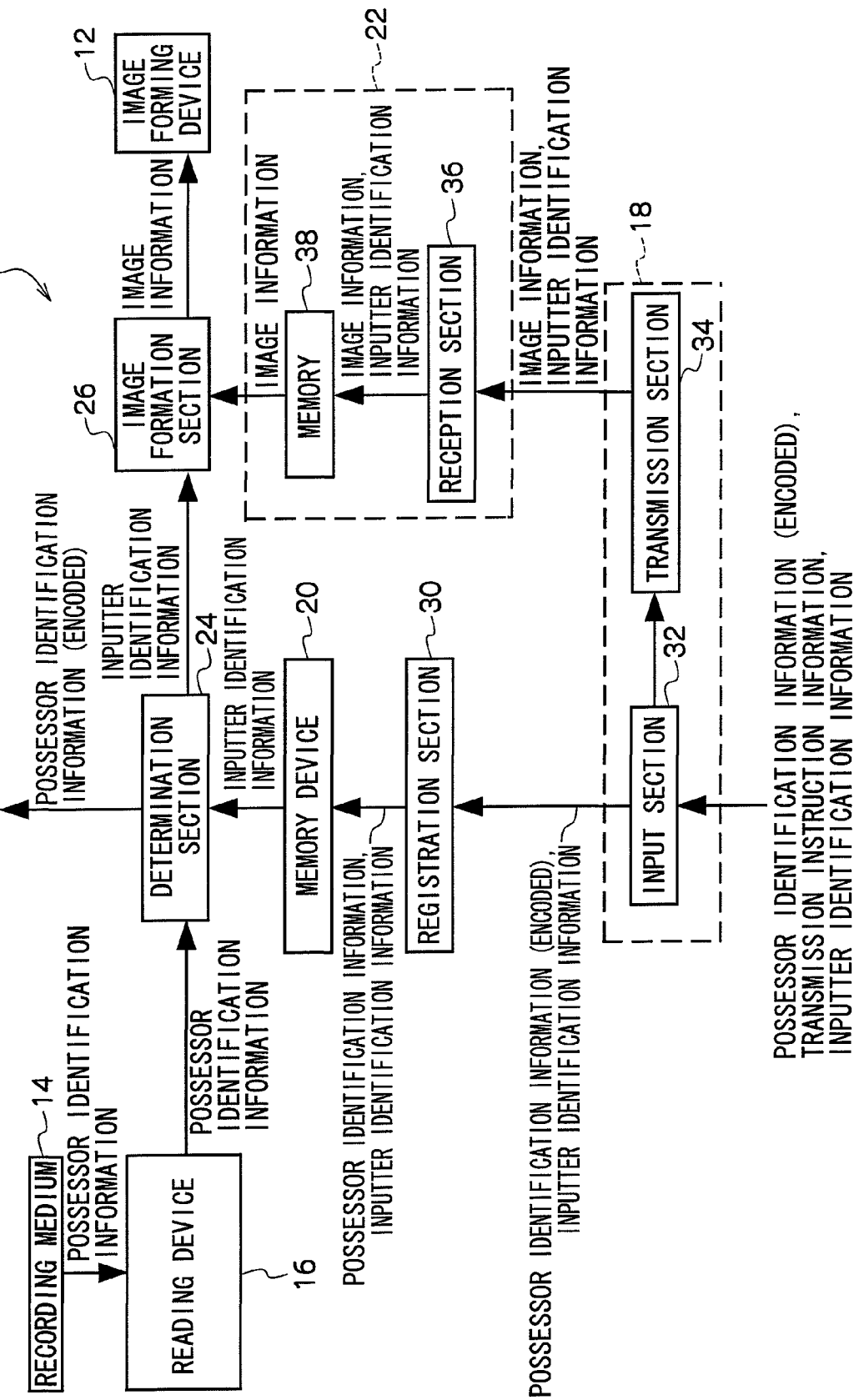
FIG. 1 is a functional block diagram showing functional structure of a system relating to the exemplary embodiments.

FIG. 1 is a functional block diagram showing functional structure of a printer system (below referred to as a "system") 10 relating to an exemplary embodiment.

As shown in FIG. 1, the system 10 is structured to include an image forming device 12, a recording medium 14, a reading device 16, an image formation instruction device 18, a memory device 20, an information retention device 22, a determination section 24, an image formation section 26, a display 28 and a registration section 30.

The image forming device 12 forms images represented by image information. The recording medium 14 pre-memorizes (stores in advance) possessor identification information, for identifying a person who possesses (carries, has, or uses) the recording medium 14, and the reading device 16 reads the possessor identification information from the recording medium 14.

The image formation instruction device 18 is structured to include an input section 32 and a transmission section 34.

Transmission instruction information, possessor identification information, inputter identification information and code input instruction information are inputted at the input section 32. The transmission instruction information instructs implementation of a transmission of image information representing an image, which is to be image-formed by the image forming device 12. Here, the possessor identification information is a code that is information in which the possessor identification information is encoded. The inputter identification information is for identifying a person who is inputting information. The code input instruction information instructs output of a display of a screen for input of a code (below referred to as a code input screen).

When transmission instruction information is inputted through the input section 32, the transmission section 34 transmits image information, the implementation of whose transmission is instructed by the transmission instruction information, together with particular information pertaining to the image information and inputter identification information.

The recording medium 14 is carried by an authorized user who is authorized to make use of the image forming device 12, and the possessor identification information is recorded at the recording medium 14. The memory device 20 memorizes the possessor identification information recorded at the recording medium 14 in association with inputter identification information that corresponds with that possessor identification information.

The information retention device 22 is structured to include a reception section 36 and a memory 38.

The reception section 36 receives the image information and the inputter identification information which have been transmitted by the transmission section 34. The memory 38 temporarily memorizes the image information and the inputter identification information received by the reception section 36, in association with one another.

The determination section 24 determines whether or not the memory device 20 has memorized possessor identification information that is read by the reading device 16.

If it is determined by the determination section 24 that the possessor identification information has been memorized in the memory device 20, the image formation section 26 reads, from the memory 38, image information that is associated with the inputter identification information that is associated in the memory device 20 with the possessor identification information. The image formation section 26 then implements image formation by the image forming device 12 in accordance with the image information.

However, if it is determined by the determination section 24 that the possessor identification information has not been memorized in the memory device 20, the display 28 outputs a display of the possessor identification information. If the possessor identification information is then inputted through the input section 32, the registration section 30 registers the possessor identification information and the inputter identification information, by memorizing the possessor identification information and the inputter identification information in association in the memory device 20.

When inputter identification information and a code are inputted through the input section 32, the registration section 30 relating to the present exemplary embodiment registers the inputter identification information and information of the code restored to an original state, that is, possessor identification information, by memorizing the inputter identification information and the possessor identification information in association in the memory device 20.

Below, specific examples of the system 10 will be described.

First Exemplary Embodiment

Figure 2:
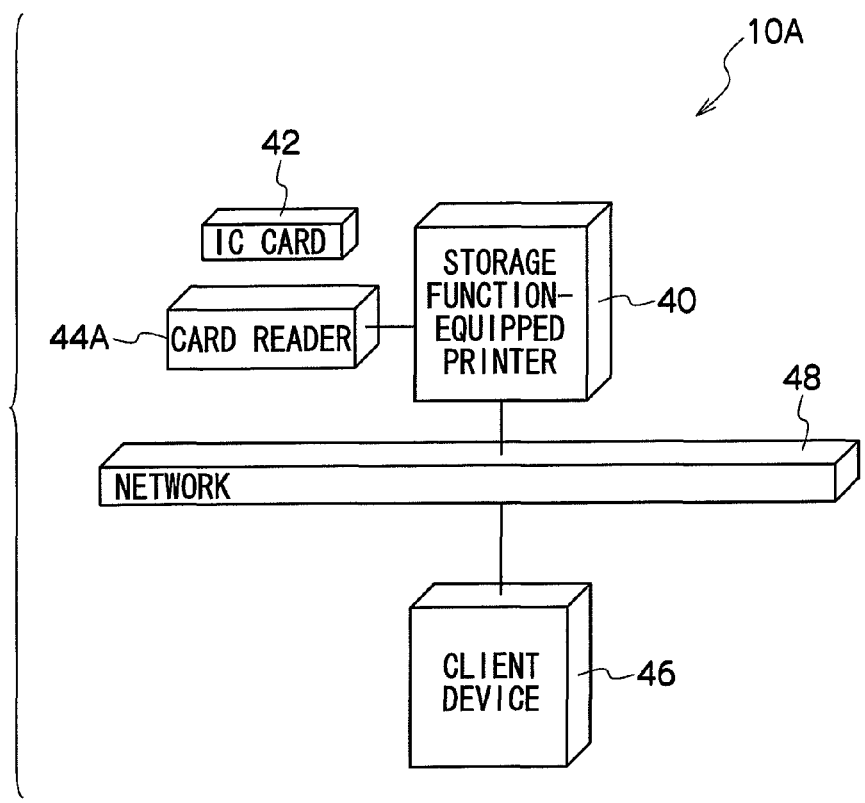
FIG. 2 is a schematic diagram showing structure of a system relating to a first exemplary embodiment.

FIG. 2 is a schematic view showing structure of a system 10A relating to the first exemplary embodiment.

As shown in FIG. 2, the system 10A is structured to include a storage function-equipped printer 40, which has an information storage function for storing possessor identification information, inputter identification information and image information, an image forming function for forming images represented by stored image information, and an authentication function for performing authentications of possessor identification information. The system 10A is further structured to include an IC card 42, a card reader 44A and a client device 46. Possessor identification information has been recorded at the IC card 42 beforehand. The card reader 44A is for reading the possessor identification information recorded at the IC card 42. The client device 46 is for transmitting various kinds of information to external devices which are connected to a network 48.

The card reader 44A is electrically connected to the storage function-equipped printer 40. The storage function-equipped printer 40 and the client device 46 are electrically connected via the network 48. In this first exemplary embodiment, a general purpose personal computer is employed as the client device 46.

In the system 10A relating to the first exemplary embodiment, a LAN (local area network) is employed as the network 48. However, this is not a limitation, and various kinds of network may be employed, such as the Internet, a VAN (value added network), a telephone network, an ECHONET (Energy Conservation and Homecare Network), HomePNA (Home Phoneline Networking Alliance) and the like, singly or in combination. Moreover, the network 48 may be wired and may be wireless.

For the first exemplary embodiment, an IC card reader which reads possessor identification information recorded at the IC card 42 when the IC card 42 is inserted therein is employed as the card reader 44A. Thus, in the first exemplary embodiment, an IC card reader is used as the card reader 44A. If a magnetic card is to be used instead of the IC card 42, a magnetic card reader may be used as the card reader 44A. Further, if a card in which an RFID (radio frequency identification system) tag is embedded is to be used as the IC card 42, an RFID reader which communicates wirelessly with the RFID tag may be used as the card reader 44A.

Figure 3:
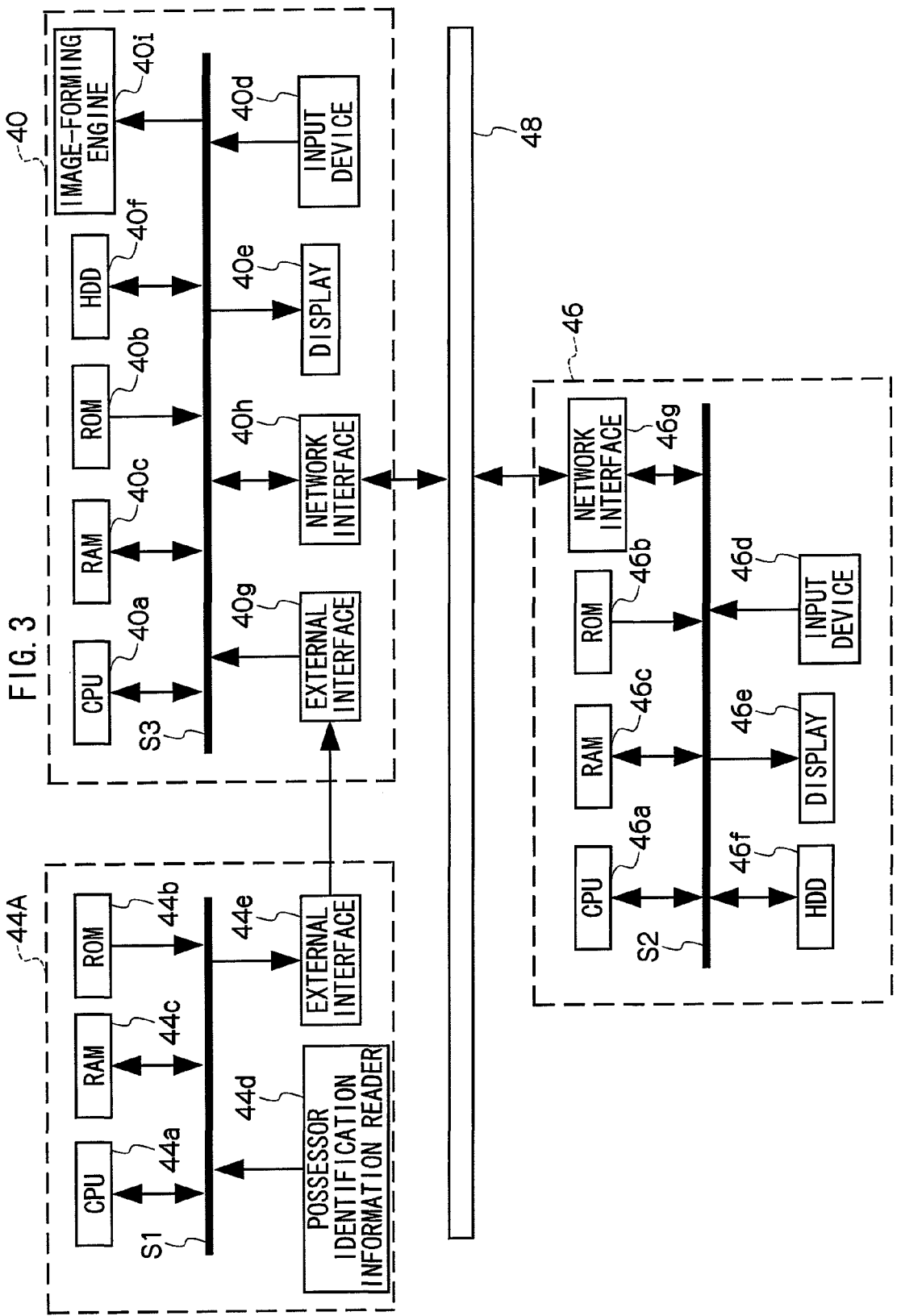
FIG. 3 is a block diagram showing principal structures of an electronic system of the system relating to the first exemplary embodiment.

FIG. 3 is a block diagram showing principal elements of an electrical system of the system 10A relating to the first exemplary embodiment.

As shown in FIG. 3, the card reader 44A is provided with a CPU (central processing unit) 44a, a ROM 44b, a RAM 44c, a possessor identification information reader 44d and an external interface 44e. The CPU 44a administers the card reader 44A as a whole. The ROM 44b pre-memorizes a control program for controlling operations of the card reader 44A, and various kinds of data and the like. The RAM 44c is used as a work area during execution of various programs and the like. The possessor identification information reader 44d reads possessor identification information recorded at the IC card 42 when the IC card 42 is inserted at the card reader 44A. The external interface 44e is connected to the storage function-equipped printer 40 and controls operations for transmission of information from the card reader 44A to external devices. These sections are electrically connected via a system bus S1.

The client device 46 is provided with a CPU 46a, a ROM 46b, a RAM 46c, an input device 46d, a display 46e, an HDD (hard disk drive) 46f and a network interface 46g. The CPU 46a administers the client device 46 as a whole. The ROM 46b pre-memorizes (stores in advance) a control program for controlling operations of the client device 46, and various kinds of data and the like. The RAM 46c is used as a work area during execution of various programs and the like. The input device 46d is structured to include a keyboard and a mouse, and inputs various kinds of information. The display 46e displays various kinds of information. The network interface 46g is connected to the network 48 and administers exchanges of various kinds of information with external devices when communications are being carried out with the external devices via the network 48. These sections are electrically connected via a system bus S2.

The storage function-equipped printer 40 is provided with a CPU 40a, a ROM 40b, a RAM 40c, an input device 40d, a display 40e, an HDD 40f, an external interface 40g, a network interface 40h and an image-forming engine 40i. The CPU 40a administers the storage function-equipped printer 40 as a whole. The ROM 40b pre-memorizes a control program for controlling operations of the storage function-equipped printer 40, and various kinds of data and the like. The RAM 40c is used as a work area during execution of various programs and the like. The input device 40d is structured to include a keyboard and a mouse, and inputs various kinds of information. The display 40e displays various kinds of information. The external interface 40g is connected to the external interface 44e of the card reader 44A and receives information transmitted from the card reader 44A. The network interface 40h is connected to the network 48 and administers exchanges of various kinds of information with external devices when communications are being carried out with the external devices via the network 48. The image-forming engine 40i performs image formation on recording paper in accordance with image information. These sections are electrically connected via a system bus S3.

In this first exemplary embodiment, the image-forming engine 40i corresponds to the image forming device 12 and the display 28; the storage function-equipped printer 40 corresponds to the information retention device 22; the IC card 42 corresponds to the recording medium 14; the card reader 44A corresponds to the reading device 16; the client device 46 corresponds to the image formation instruction device 18; the HDD 40f corresponds to the memory device 20 and the memory 38; the CPU 40a corresponds to the determination section 24, the image formation section 26, the registration section 30 and the reception section 36; the input device 46d corresponds to the input section 32; and the CPU 46a corresponds to the transmission section 34.

FIG. 4 is a schematic view showing an example of possessor identification information and inputter identification information which are memorized in the HDD 40f relating to the first exemplary embodiment. As shown in FIG. 4, possessor identification information and inputter identification information that corresponds to the possessor identification information are recorded in association.

Now, in the storage function-equipped printer 40 relating to the first exemplary embodiment, when it is determined by the CPU 40a that possessor identification information has not been memorized in the HDD 40f, encoding processing which encodes the possessor identification information is performed.

Figure 5:
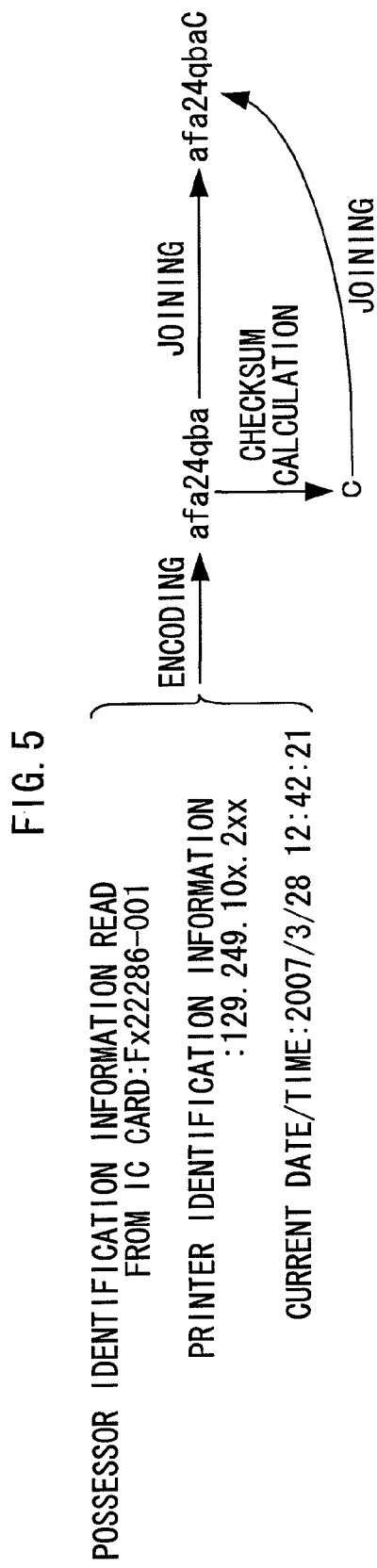
FIG. 5 is a schematic diagram showing an example of a flow of encoding processing at a printer with a storage function relating to the first exemplary embodiment.

FIG. 5 is a schematic diagram showing an example of a flow of encoding processing at the storage function-equipped printer 40 relating to the first exemplary embodiment. As shown in FIG. 5, when the storage function-equipped printer 40 receives possessor identification information from the card reader 44A, the storage function-equipped printer 40 encodes the possessor identification information with a pre-specified algorithm on the basis of the possessor identification information, printer identification information for identifying the storage function-equipped printer 40, and current time information representing a current date and time (here, the date/time at which the storage function-equipped printer 40 receives the possessor identification information from the card reader 44A). Then, the storage function-equipped printer 40 calculates a checksum of the encoded possessor identification information (shown in FIG. 5 as "afa24qba"). Thus, the storage function-equipped printer 40 generates a code (cipher) (shown as "afa24qbaC" in FIG. 5), which is information in which the checksum (shown as "C" in FIG. 5) is joined to the end of the encoded possessor identification information.

Processing by the functional blocks of the system 10 (the determination section 24, the image formation section 26, the registration section 30, the input section 32, the transmission section 34 and the reception section 36) may be realized by a software structure utilizing a computer, by executing a client device processing program and a storage function-equipped printer processing program, which are described below. However, realization is obviously not limited to software structures, and the functions may be realized by a hardware structure, a combination of a hardware structure and a software structure, or the like.

Herebelow, the system 10A relating to the first exemplary embodiment will be described for a case in which processing by the above-mentioned functional blocks is realized by execution of the client device processing program and the storage function-equipped printer processing program. For such a case, a mode in which the client device processing program is pre-installed at the client device 46 and the storage function-equipped printer processing program is pre-installed at the storage function-equipped printer 40, a mode in which the programs are provided stored on computer-readable recording media, a mode in which the programs are distributed through communication units by wire or wirelessly, or the like may be employed.

Next, operation of the system 10A will be described.

Figure 6:
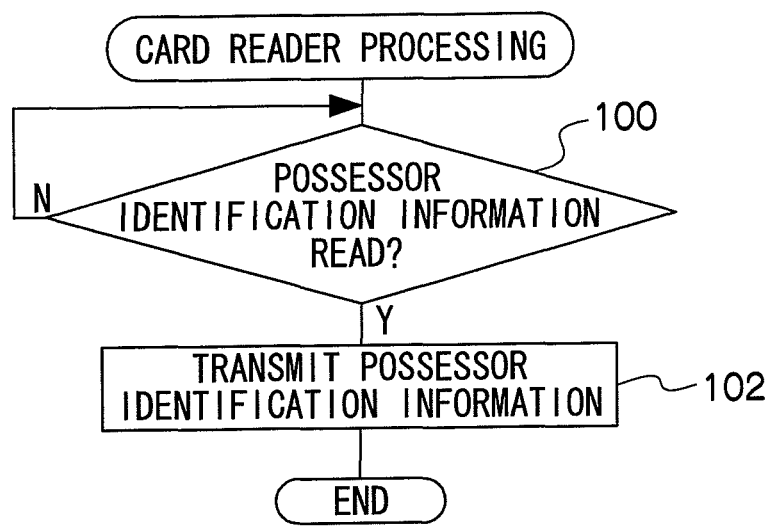
FIG. 6 is a flowchart showing a flow of processing of a card reader processing program relating to the first exemplary embodiment.

First, operation of the card reader 44A of the system 10A will be described with reference to FIG. 6. FIG. 6 is a flowchart showing a flow of processing of a card reader processing program that is executed by the CPU 44*a* of the card reader 44A when the card reader 44A is activated. This program is pre-memorized at a predetermined region of the ROM 44*b*.

In step 100 of FIG. 6, the processing waits for reading of possessor identification information by the possessor identification information reader 44*d*. Then, in step 102, the possessor identification information read at the possessor identification information reader 44*d* is transmitted to the storage function-equipped printer 40, and the card reader processing program ends.

Figure 7:
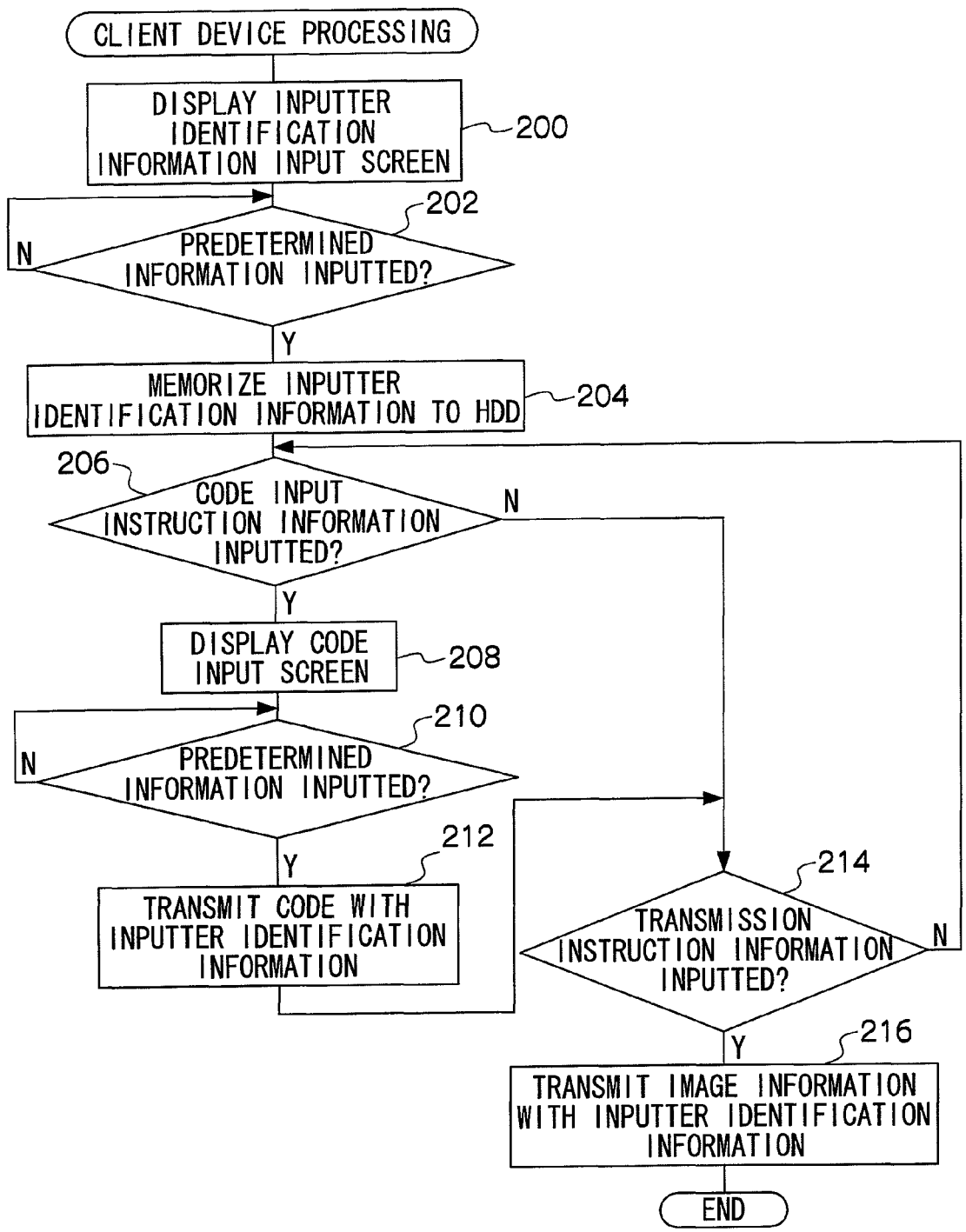
FIG. 7 is a flowchart showing a flow of processing of a client device processing program relating to the first exemplary embodiment.

Next, operation of the client device 46 will be described with reference to FIG. 7. FIG. 7 is a flowchart showing a flow of processing of the client device processing program that is executed by the CPU 46*a* of the client device 46 when the client device 46 is activated. This program is pre-memorized at a predetermined region of the ROM 46*b*.

In step 200 of FIG. 7, an inputter identification information input screen (not shown) is displayed at the display 46*e* for input of inputter identification information (here, a login name which is used when logging in to the client device 46). Then, in step 202, the processing waits for input. When the inputter identification information input screen is displayed at the display 46*e*, a user inputs inputter identification information on the screen. In response, the processing of step 202 produces a positive determination and the processing advances to step 204.

In step 204, the inputter identification information is memorized at the HDD 46*f*. Thereafter, the processing advances to step 206, and it is determined whether or not code input instruction information has been inputted. If this determination is positive, the processing advances to step 208, and if the determination is negative, the processing advances to step 214.

In step 208, a code input screen is displayed at the display 46*e*. Then, in step 210, the processing waits for input of predetermined information. When the code input information screen is displayed at the display 46*e*, the user inputs a code on the screen. In response, the processing of step 210 produces a positive determination and the processing advances to step 212.

In this first exemplary embodiment, at the code input screen, a code that is displayed by processing of step 318 of the storage function-equipped printer processing program, which will be described later, should be inputted through the input device 46*d*. In step 212, the code is transmitted to the storage function-equipped printer 40, together with the inputter identification information that has been memorized in the HDD 46*f* by the processing of the above-mentioned step 204, and the processing advances to step 214.

In this first exemplary embodiment, the processing in step 212 is to put the login name (labeled "inputter identification information" in FIG. 8) and the code into a single electronic file as shown in FIG. 8 and transmit the electronic file to the storage function-equipped printer 40.

Anyway, in step 214, it is determined whether or not transmission instruction information has been inputted. If this determination is positive, the processing advances to step 216, and if the determination is negative, the processing returns to step 206.

In step 216, the image information whose transmission has been instructed by the transmission instruction information is transmitted to the storage function-equipped printer 40, together with the inputter identification information that has been memorized in the HDD 46*f* by the processing of step 204. Then the client device processing program ends.

Figure 9:
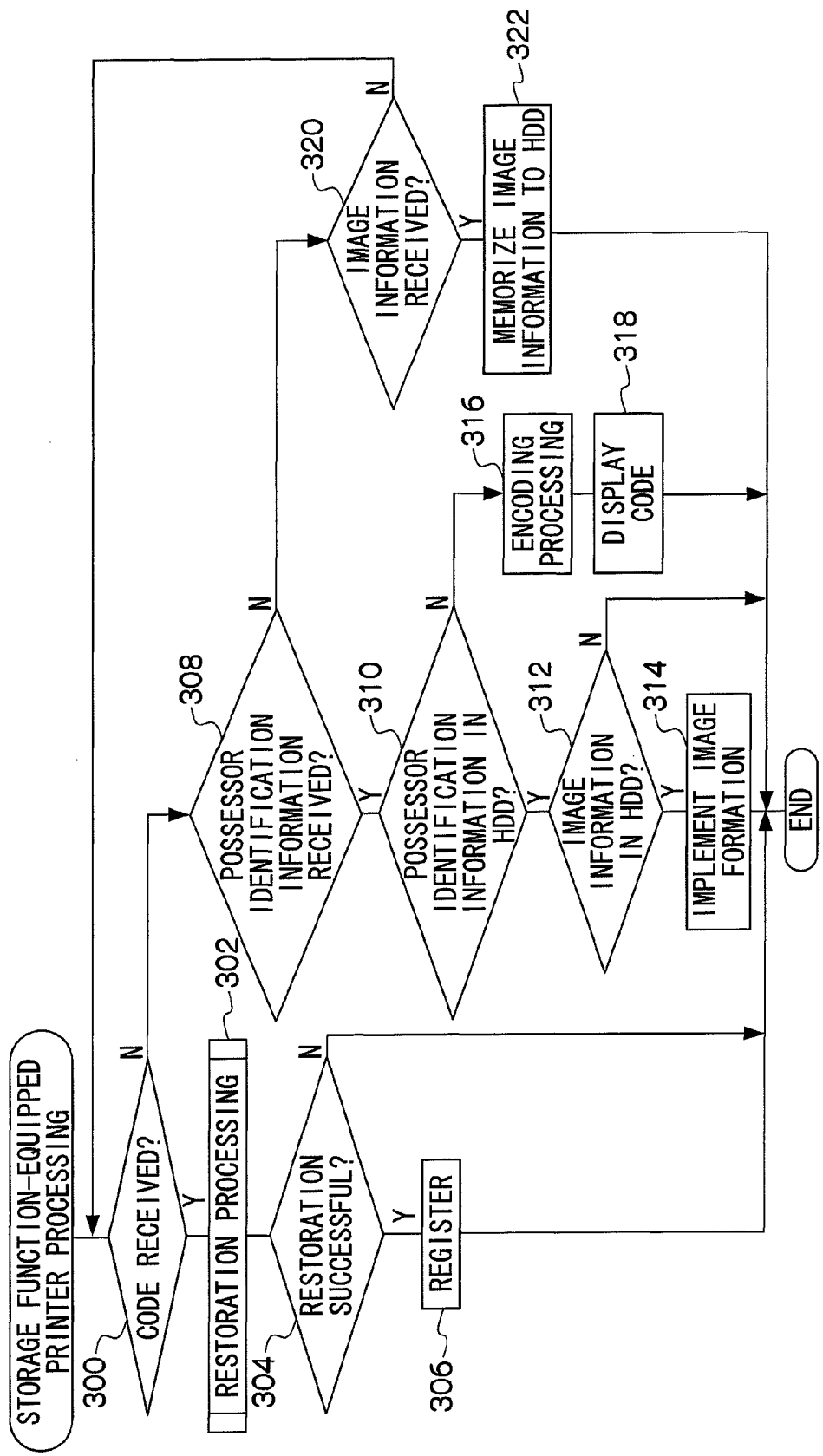
FIG. 9 is a flowchart showing a flow of processing of a processing program of the printer with the storage function relating to the first exemplary embodiment.

Next, operation of the storage function-equipped printer 40 will be described with reference to FIG. 9. FIG. 9 is a flowchart showing a flow of processing of the storage function-equipped printer processing program that is executed by the CPU 40*a* of the storage function-equipped printer 40 when the storage function-equipped printer 40 is activated. This program is pre-memorized at a predetermined region of the ROM 40*b*.

In step 300 of FIG. 9, it is determined whether or not a code and inputter identification information, which are transmitted by the processing of step 212 of the above-described client device processing program, have been received. If this determination is positive, the processing advances to step 302 and a restoration processing routine program, which is described below, is executed. On the other hand, if the determination is negative, the processing advances to step 308.

Figure 10:
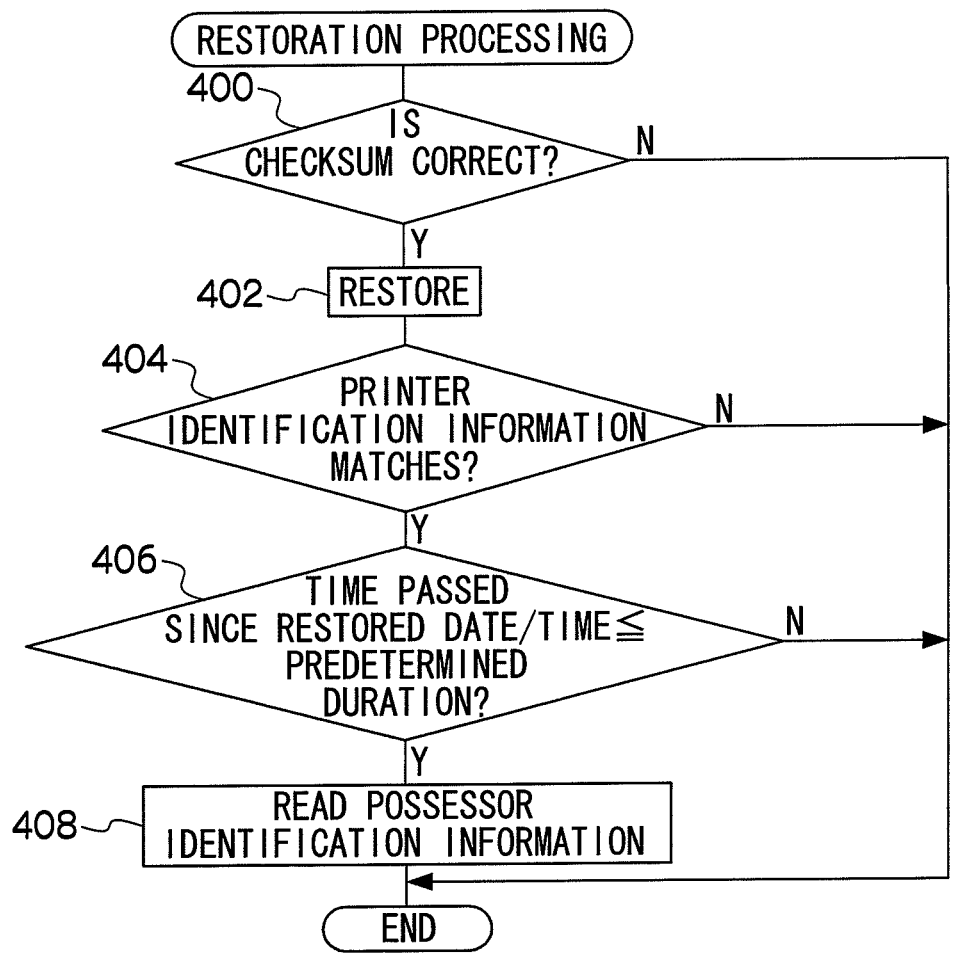
FIG. 10 is a flowchart showing a flow of processing of a restoration processing routine program relating to the first exemplary embodiment.

Now, the restoration processing routine program relating to the first exemplary embodiment will be described with reference to FIG. 10. FIG. 10 is a flowchart showing a flow of processing of the restoration processing routine program. This program is pre-memorized at a predetermined region of the ROM 40*b*.

In step 400 of FIG. 10, a checksum of the encoded possessor identification information that is included in the code is calculated, and it is determined whether or not the calculated checksum matches the checksum that has been included in the code. If it is determined that the two match, this determination is positive and the processing advances to step 402. However, if it is determined that the two do not match, the determination is negative, the restoration processing routine program ends, and processing transfers to step 304 of FIG. 9. In step 402, the code is restored to the original state thereof, that is, the possessor identification information, the printer identification information and the current time information.

Then, in step 404, it is determined whether or not the printer identification information that has been restored by the processing of step 402 matches printer identification information held by the storage function-equipped printer 40. If this determination is positive, the processing advances to step 406. However, if the determination is negative, the restoration processing routine program ends and the processing transfers to step 304 of FIG. 9.

In step 406, it is determined whether or not an amount of time that has passed since the date/time represented by the current time information, which has been restored by the processing of step 402, is less than a pre-specified duration. If this determination is positive, the processing advances to step 408. However, if the determination is negative, the restoration processing routine program ends and the processing transfers to step 304 of FIG. 9.

In step 408, the possessor identification information is extracted from the possessor identification information, printer identification information and the current time information that have been restored by the processing of step 402. Thereafter, the restoration processing routine program ends and the processing transfers to step 304 of FIG. 9.

In step 304 of FIG. 9, if possessor identification information has been extracted by the processing of the above-described step 302, it is determined that restoration of the code has been successful, and the processing advances to step 306. However, if possessor identification information has not been extracted by the processing of step 302, it is determined that restoration of the code has failed, and the storage function-equipped printer processing program ends.

In step 306, the possessor identification information extracted by the processing of step 302 and the inputter identification information that has been received with the code according to the processing of step 300 are memorized in association in the HDD 40f. Then the storage function-equipped printer processing program ends.

Alternatively, in step 308, it is determined whether or not possessor identification information has been received due to the processing of step 102 of the above-described card reader processing program. If this determination is positive, the processing advances to step 310. On the other hand, if the determination is negative, the processing advances to step 320.

In step 310, it is determined whether or not possessor identification information that is the same as the possessor identification information received according to the processing of step 308 has been memorized in the HDD 40f. If this determination is positive, the processing advances to step 312. On the other hand, if the determination is negative, the processing advances to step 316.

In step 312, it is determined whether or not image information has been memorized in the HDD 40f that is associated with inputter identification information that is associated with the possessor identification information that is the same as the possessor identification information that has been received according to the processing of step 308. If this determination is negative, the storage function-equipped printer processing program ends. However, if the determination is positive, the processing advances to step 314, the image information is read from the HDD 40f, and the image-forming engine 40i is caused to execute image formation in accordance with the image information.

In step 316, the earlier-described encoding processing is applied to the possessor identification information that has been received according to the processing of step 308. The processing advances to step 318, and the image-forming engine 40i is caused to display the code generated by this encoding processing, by image formation on a recording paper. Then the storage function-equipped printer processing program ends.

In this first exemplary embodiment, the processing in the above-described step 318 is to cause the image-forming engine 40i to display, by image formation on a recording paper, the code generated by the above encoding processing and an expiration time, until the possessor identification information obtained by restoration of the code will be registered by memorization at the HDD 40f, as shown in FIG. 11.

In step 320, it is determined whether or not image information and inputter identification information transmitted by the processing of step 216 of the above-described client device processing program have been received. If this determination is negative, the processing returns to step 300. However, if the determination is positive, the processing advances to step 322, and the image information and the inputter identification information that have been received according to the processing of step 320 are memorized in the HDD 40f in association with one another. Thereafter, the storage function-equipped printer processing program ends.

For this first exemplary embodiment, a description has been given for an example in which the storage function-equipped printer 40 and the card reader 44A are structured separately. However, the present invention is not limited thus; the storage function-equipped printer 40 and the card reader 44A may be integrally structured.

Furthermore, for this first exemplary embodiment, a description has been given for an example in which the possessor identification information is encoded at the storage function-equipped printer 40. However, the possessor identification information may be encoded at the card reader 44A.

Second Exemplary Embodiment

For a second exemplary embodiment, a case will be described in which structure of a system that employs the present invention differs from the first exemplary embodiment.

Figure 12:
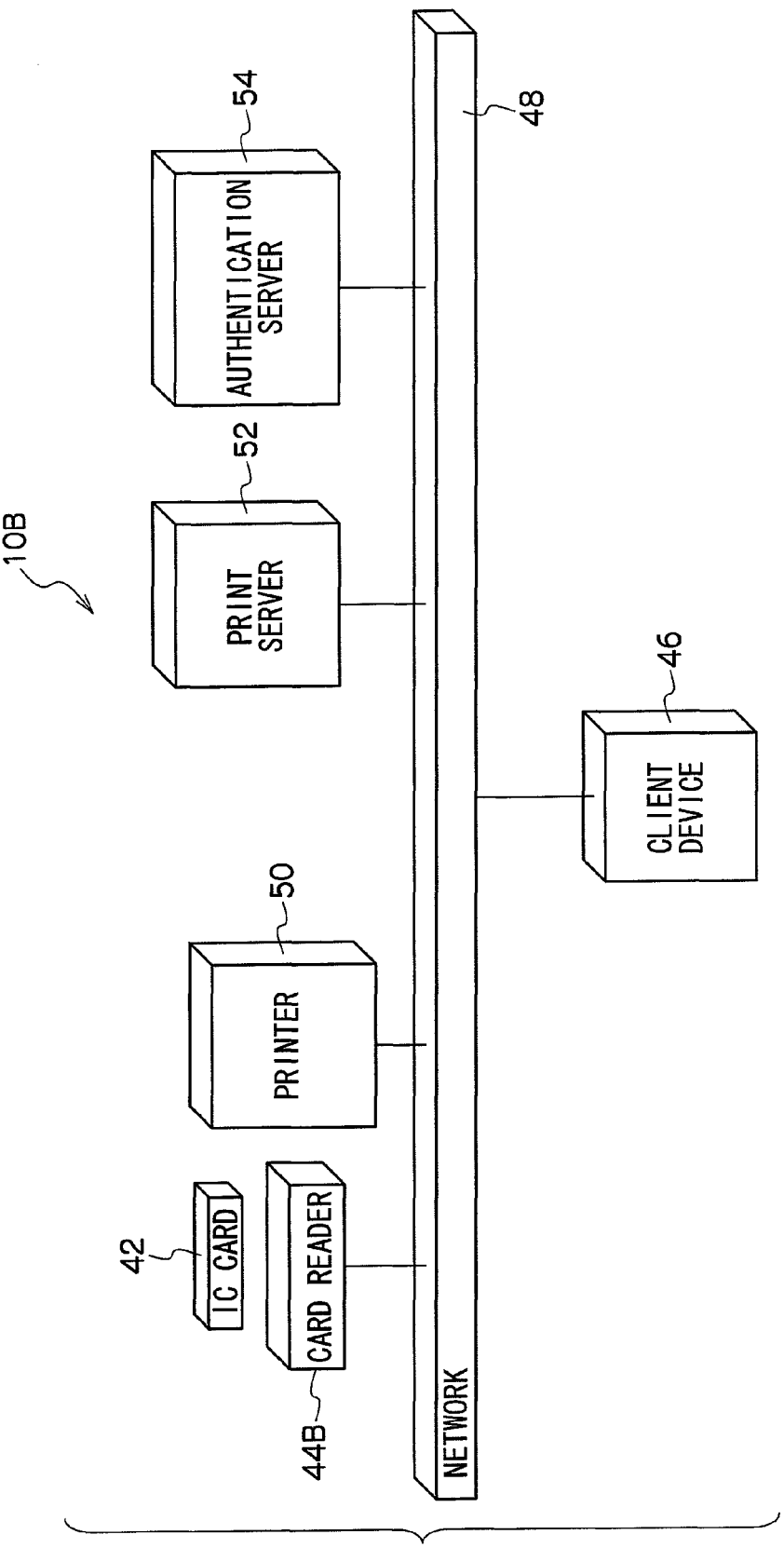
FIG. 12 is a schematic diagram showing structure of a system relating to a second exemplary embodiment.

FIG. 12 is a schematic view showing structure of a system 10B relating to the second exemplary embodiment. Herebelow, structural elements that are the same as in FIG. 2 are assigned the same reference numerals as in FIG. 2 and descriptions thereof will not be given.

As shown in FIG. 12, the system 10B differs from the system 10A of the first exemplary embodiment only in that: a card reader 44B is employed instead of the card reader 44A; and a printer 50, a print server 52 and an authentication server 54 are employed instead of the storage function-equipped printer 40.

The card reader 44B reads possessor identification information recorded at the IC card 42. The printer 50 forms an image represented by image information. The print server 52 receives image information which is transmitted from the client device 46, stores the received image information, and transmits the stored image information to the printer 50 in response to a request. The authentication server 54 stores possessor identification information and inputter identification information, and performs authentication of the possessor identification information read by the card reader 44B.

The card reader 44B, the client device 46, the printer 50, the print server 52 and the authentication server 54 are electrically connected via the network 48. In this second exemplary embodiment, general purpose personal computers are employed for each of the print server 52 and the authentication server 54.

Figure 13:
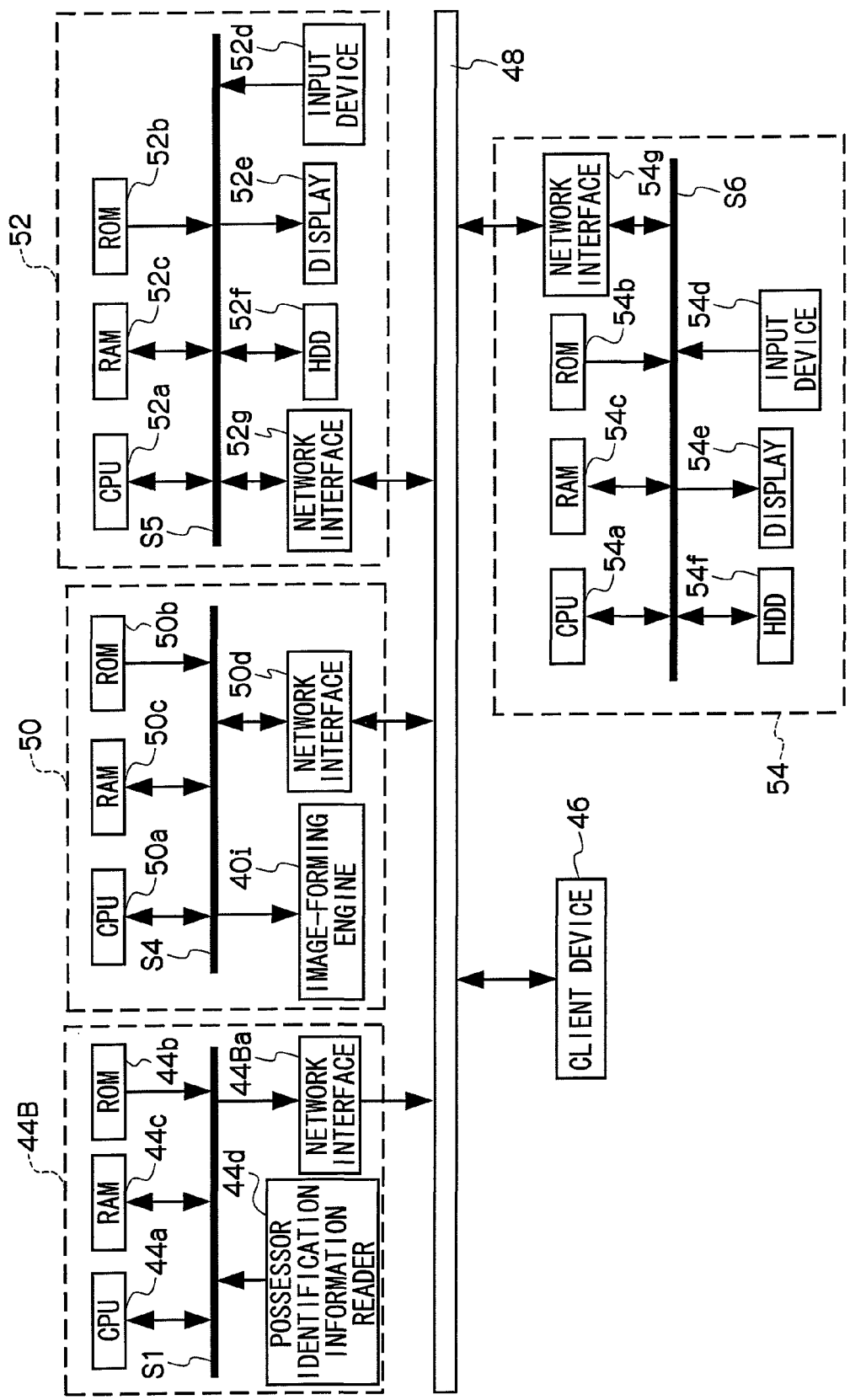
FIG. 13 is a block diagram showing principal structures of an electronic system of the system relating to the second exemplary embodiment.

FIG. 13 is a block diagram showing principal structures of an electrical system of the system 10B relating to the second exemplary embodiment. Herebelow, structural elements that are the same as in FIG. 3 will be assigned the same reference numerals and descriptions thereof will not be given.

Compared with the card reader 44A described for the first exemplary embodiment, the card reader 44B differs only in that a network interface 44Ba is employed instead of the external interface 44e. The network interface 44Ba is connected to the network 48, and controls operations for transmission of information from the card reader 44B to external devices via the network 48.

The printer 50 is provided with an image forming engine 40i, a CPU 50a, a ROM 50b, a RAM 50c and a network interface 50d. The CPU 50a administers the printer 50 as a whole. The ROM 50b pre-memorizes a control program for controlling operations of the printer 50, and various kinds of data and the like. The RAM 50c is used as a work area during execution of various programs and the like. The network interface 50d is connected to the network 48 and administers exchanges of various kinds of information with external devices when communications are being carried out with the external devices via the network 48. These sections are electrically connected via a system bus S4.

The print server 52 is provided with a CPU 52a, a ROM 52b, a RAM 52c, an input device 52d, a display 52e, an HDD

52f and a network interface 52g. The CPU 52a administers the print server 52 as a whole. The ROM 52b pre-memorizes a control program for controlling operations of the print server 52, and various kinds of data and the like. The RAM 52c is used as a work area during execution of various programs and the like. The input device 52d is structured to include a keyboard and a mouse, and inputs various kinds of information. The display 52e displays various kinds of information. The network interface 52g is connected to the network 48 and administers exchanges of various kinds of information with external devices when communications are being carried out with the external devices via the network 48. These sections are electrically connected via a system bus S5.

The authentication server 54 is provided with a CPU 54a, a ROM 54b, a RAM 54c, an input device 54d, a display 54e, an HDD 54f and a network interface 54g. The CPU 54a administers the authentication server 54 as a whole. The ROM 54b pre-memorizes a control program for controlling operations of the authentication server 54, and various kinds of data and the like. The RAM 54c is used as a work area during execution of various programs and the like. The input device 54d is structured to include a keyboard and a mouse, and inputs various kinds of information. The display 54e displays various kinds of information. The network interface 54g is connected to the network 48 and administers exchanges of various kinds of information with external devices when communications are being carried out with the external devices via the network 48. These sections are electrically connected via a system bus S6.

In this second exemplary embodiment, the image-forming engine 40i corresponds to the image forming device 12 and the display 28; the IC card 42 corresponds to the recording medium 14; the card reader 44B corresponds to the reading device 16; the client device 46 corresponds to the image formation instruction device 18; the HDD 54f corresponds to the memory device 20; the print server 52 corresponds to the information retention device 22; the CPU 54a corresponds to the determination section 24 and the registration section 30; the CPU 50a corresponds to the image formation section 26; the input device 46d corresponds to the input section 32; the CPU 46a corresponds to the transmission section 34; the CPU 52a corresponds to the reception section 36; and the HDD 52f corresponds to the memory 38.

Next, operation of the system 10B will be described. Operation of the client device 46 of the system 10B is the same as operation of the client device 46 described for the first exemplary embodiment and therefore will not be described here, except in the following respects: instead of a code being transmitted to the storage function-equipped printer 40 together with inputter identification information, a code is transmitted to the authentication server 54 together with inputter identification information; and instead of image information being transmitted to the storage function-equipped printer 40 together with the inputter identification information, image information is transmitted to the print server 52 together with the inputter identification information. Furthermore, operation of the card reader 44B of the system 10B is the same as operation of the card reader 44A described for the first exemplary embodiment and therefore will not be described here, except in the following respect: instead of possessor identification information being transmitted to the storage function-equipped printer 40, possessor identification information is transmitted to the authentication server 54.

Figure 14:
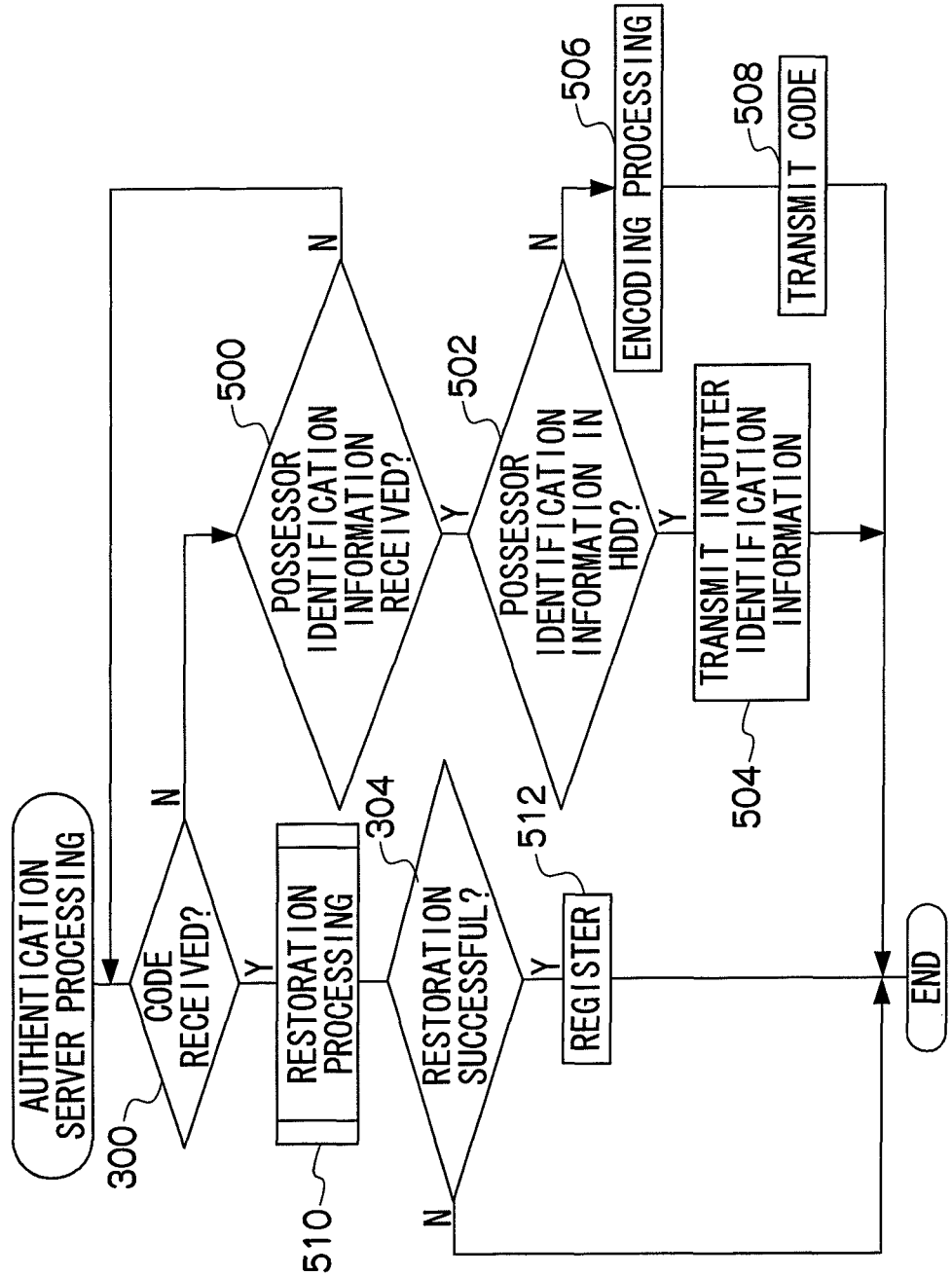
FIG. 14 is a flowchart showing a flow of processing of an authentication server processing program relating to the second exemplary embodiment.

First, operation of the authentication server 54 of the system 10B will be described with reference to FIG. 14. FIG. 14 is a flowchart showing a flow of processing of an authentication server processing program that is executed by the CPU 54a of the authentication server 54 when the authentication server 54 is activated. This program is pre-memorized at a predetermined region of the ROM 54b. Steps in FIG. 14 that perform processing the same as in the program illustrated in FIG. 9 are assigned the same step numbers as in FIG. 9 and descriptions thereof will not be given.

Compared with the storage function-equipped printer processing program described above for the first exemplary embodiment, the authentication server processing program differs only in that: the processing of a step 500 is applied instead of the processing of step 308; the processing of a step 502 is applied instead of the processing of step 310; the processing of a step 504 is applied instead of the processing of step 312 and the processing of step 314; the processing of a step 506 is applied instead of the processing of step 316; the processing of a step 508 is applied instead of the processing of step 318; the processing of a step 510 is applied instead of the processing of step 302; the processing of a step 512 is applied instead of the processing of step 306; and the processing of step 320 and the processing of step 322 are omitted.

In step 500, it is determined whether or not possessor identification information transmitted by the processing of step 102 of the earlier-described card reader processing program has been received. If this determination is positive, the processing advances to step 502, and if the determination is negative, the processing returns to step 300.

In step 502, it is determined whether or not the possessor identification information received according to the processing of step 500 has been memorized in the HDD 54f. If this determination is positive, the processing advances to step 504. On the other hand, if the determination is negative, the processing advances to step 506.

In step 504, inputter identification information that is associated with possessor identification information that is the same as the possessor identification information received according to the processing of step 500 is read from the HDD 54f, and the inputter identification information that is read is transmitted to the print server 52. Then the authentication server processing program ends.

In step 506, the earlier-described encoding processing is applied to the possessor identification information that has been received according to the processing of step 500, and the processing advances to step 508.

Compared with the encoding processing described for the first exemplary embodiment, the encoding processing relating to the second exemplary embodiment differs only in that: authentication server identification information for identifying the authentication server 54 is employed instead of the printer identification information; and reception time information representing a date and time at which the authentication server 54 has received the possessor identification information from the card reader 44B is employed instead of the current time information representing a date and time at which the storage function-equipped printer 40 has received possessor identification information from the card reader 44A.

In step 508, the code generated by the processing of step 506 is transmitted to the printer 50. Then the authentication server processing program ends.

Alternatively, in step 510, a restoration processing routine program relating to the second exemplary embodiment is executed.

Compared with the restoration processing routine program described for the first exemplary embodiment, the restoration processing routine program relating to the second exemplary embodiment differs only in the following respects: in step 402, instead of processing for restoring a code to possessor identification information, printer identification information and current time information, processing for restoring a code to possessor identification information, authentication server identification information and reception time information is employed; in step 404, instead of processing for determining whether or not the printer identification information restored by the processing of step 402 matches printer identification information held by the storage function-equipped printer 40, processing for determining whether or not the authentication server identification information restored by the processing of step 402 matches authentication server identification information held by the authentication server 54 is employed; and in step 406, instead of processing for determining whether or not an amount of time that has passed since a date/time represented by the current time information restored by the processing of step 402 is less than a pre-specified duration, processing for determining whether or not an amount of time that has passed since a date/time represented by the reception time information restored by the processing step 402 is less than a pre-specified duration is employed.

Hence, in step 512, the possessor identification information extracted by the processing of step 510 and the inputter identification information received together with the code according to the processing of step 300 are registered by being memorized in association at the HDD 54f. Thereafter, the authentication server processing program ends.

Figure 15:
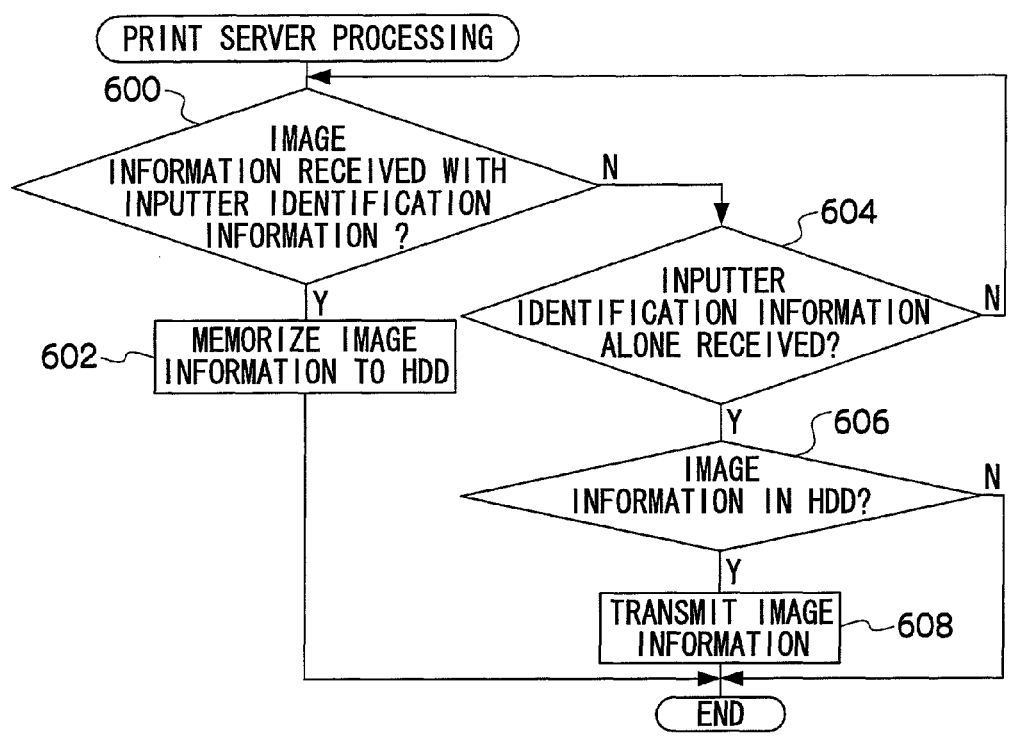
FIG. 15 is a flowchart showing a flow of processing of a print server processing program relating to the second exemplary embodiment.

Next, operation of the print server 52 of the system 10B will be described with reference to FIG. 15. FIG. 15 is a flowchart showing a flow of processing of a print server processing program that is executed by the CPU 52a of the print server 52 when the print server 52 is activated. This program is pre-memorized at a predetermined region of the ROM 52b.

Firstly, in step 600, it is determined whether or not image information has been received together with inputter identification information. If this determination is positive, the processing advances to step 602. Information corresponding to the image information and the inputter identification information that have been received according to the processing of step 600 are memorized in association with one another in the HDD 52f. Then the print server processing program ends.

On the other hand, if the determination of step 600 is negative, the processing advances to step 604, and it is determined whether or not inputter identification alone has been received. If this determination is positive, the processing advances to step 606, and if the determination is negative, the processing returns to step 600.

In step 606, it is determined whether or not image information has been memorized in the HDD 52f that is associated with inputter identification information that is the same as the inputter identification information that has been received according to the processing of step 604. If this determination is positive, the processing advances to step 608, and if the determination is negative, the print server processing program ends.

In step 608, the image information that is associated with the inputter identification information that is the same as the inputter identification information received according to the processing of step 604 is read from the HDD 52f, and the image information that is read is transmitted to the printer 50. Then the print server processing program ends.

Figure 16:
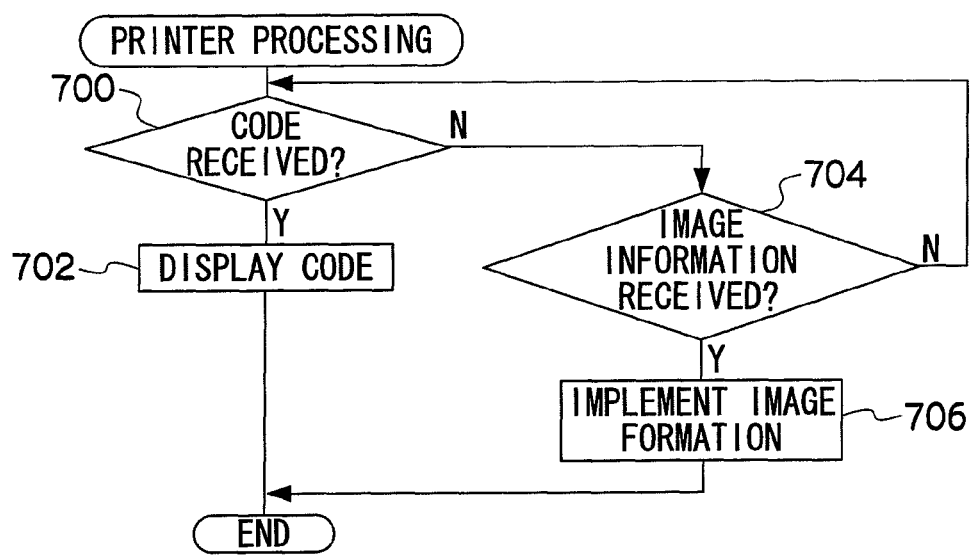
FIG. 16 is a flowchart showing a flow of processing of a printer processing program relating to the second exemplary embodiment.

Next, operation of the printer 50 of the system 10B will be described with reference to FIG. 16. FIG. 16 is a flowchart showing a flow of processing of a printer processing program that is executed by the CPU 50a of the printer 50 when the printer 50 is activated. This program is pre-memorized at a predetermined region of the ROM 50b.

Firstly, in step 700, it is determined whether or not a code transmitted by the processing of step 508 of the above-described authentication server processing program has been received. If this determination is positive, the processing advances to step 702, whereas if the determination is negative, the processing advances to step 704.

In step 702, the image-forming engine 40i is caused to display the code received according to the processing of step 700, by image formation on a recording paper. Then the printer processing program ends.

In this second exemplary embodiment, the processing of the above-described step 702 is to cause the image-forming engine 40i to display, by image formation on a recording paper, the code received according to the processing of step 700 and an expiration time until which the possessor identification information obtained by restoration of the code will be registered by memorization at the HDD 54f.

Further, in the second exemplary embodiment, at the earlier-mentioned code input screen, the code that is displayed by the above-described step 702 is inputted through the input device 46d.

In step 704, it is determined whether or not image information transmitted by the processing of step 608 of the above-described print server processing program has been received. If this determination is positive, the processing advances to step 706, and the image-forming engine 40i is caused to implement image formation in accordance with the image information received according to the processing of step 704. Then the printer processing program ends. On the other hand, if the determination is negative, the processing returns to step 700.

Figure 17:
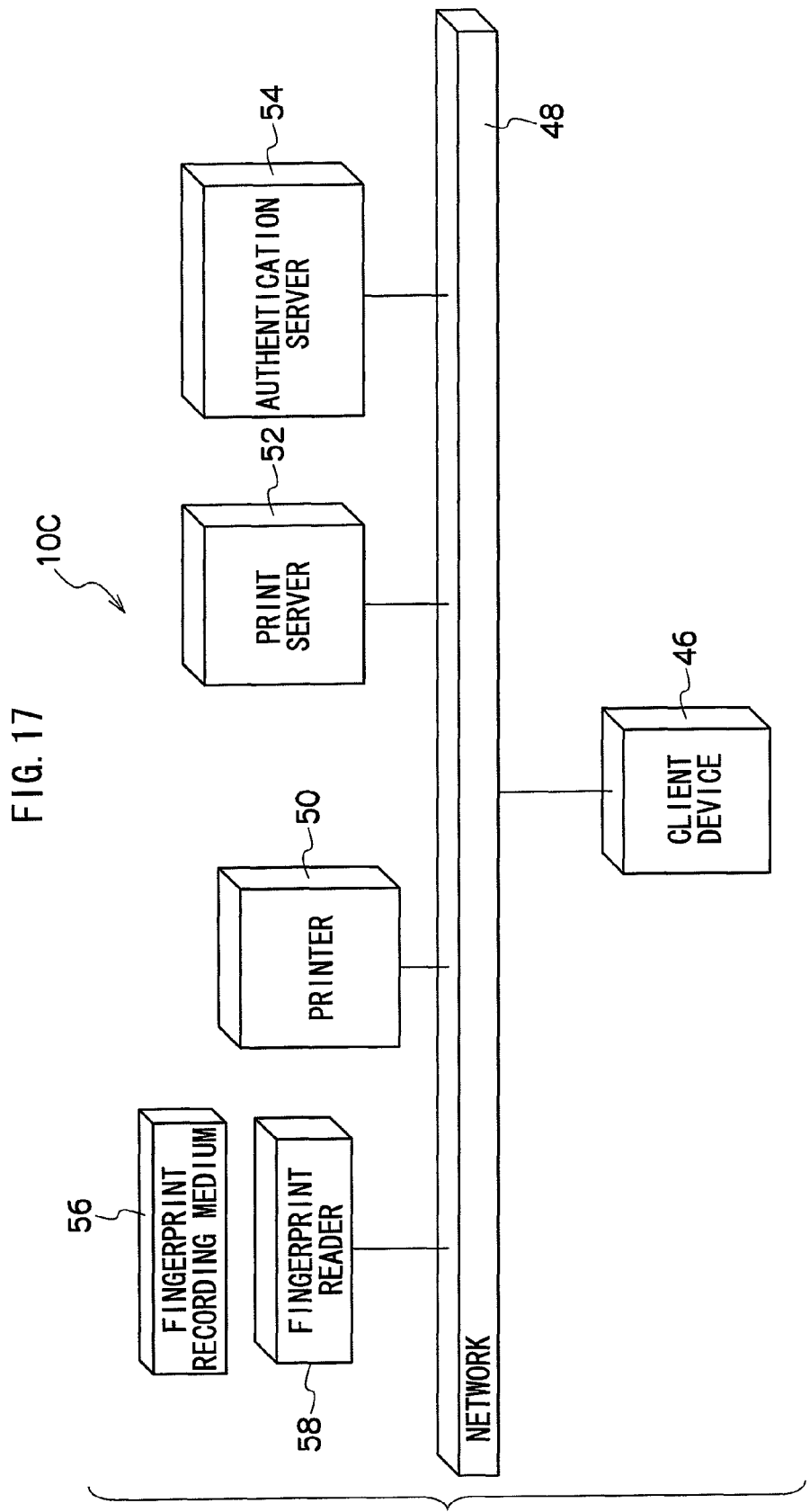
FIG. 17 is a schematic diagram showing another structure of the system relating to the second exemplary embodiment.

For this second exemplary embodiment, a description has been given for an example of a case in which the card reader 44B is employed, which has a function for reading the possessor identification information recorded at the IC card 42. However, the present invention is not limited thus. A system 10C as shown in FIG. 17 may be employed. Compared with the system 10B, the system 10C differs only in that: a fingerprint recording medium 56, at which a fingerprint is recorded, is employed instead of the IC card 42; and a fingerprint reader 58, which reads fingerprints, is employed instead of the card reader 44B. In such a case, fingerprint information representing characteristics of the fingerprint is employed as the possessor identification information.

Further, for the second exemplary embodiment, a description has been given for an example in which the printer 50 and the print server 52 are structured separately. However, the present invention is not limited thus; the printer 50 and the print server 52 may be integrally structured.

Further, for the second exemplary embodiment, a description has been given for an example in which the print server 52 and the authentication server 54 are structured separately. However, the present invention is not limited thus; the print server 52 and the authentication server 54 may be integrally structured.

Further, for the second exemplary embodiment, a description has been given for an example in which the printer 50 and the authentication server 54 are structured separately. However, the present invention is not limited thus; the printer 50 and the authentication server 54 may be integrally structured.

Further, for the second exemplary embodiment, a description has been given for an example in which the card reader 44B and the printer 50 are structured separately. However, the present invention is not limited thus; the card reader 44B and the printer 50 may be integrally structured.

Further, for the second exemplary embodiment, a description has been given for an example in which the card reader 44B and the print server 52 are structured separately. However, the present invention is not limited thus; the card reader 44B and the print server 52 may be integrally structured.

Further, for the second exemplary embodiment, a description has been given for an example in which the card reader 44B and the authentication server 54 are structured separately. However, the present invention is not limited thus; the card reader 44B and the authentication server 54 may be integrally structured.

Furthermore, for the second exemplary embodiment, a description has been given for an example in which the possessor identification information is encoded at the authentication server 54. However, the possessor identification information may be encoded at the card reader 44B, the printer 50 or the print server 52.

Third Exemplary Embodiment

For a third exemplary embodiment, a case will be described in which structure of a system that employs the present invention differs from the first exemplary embodiment and the second exemplary embodiment.

Figure 18:
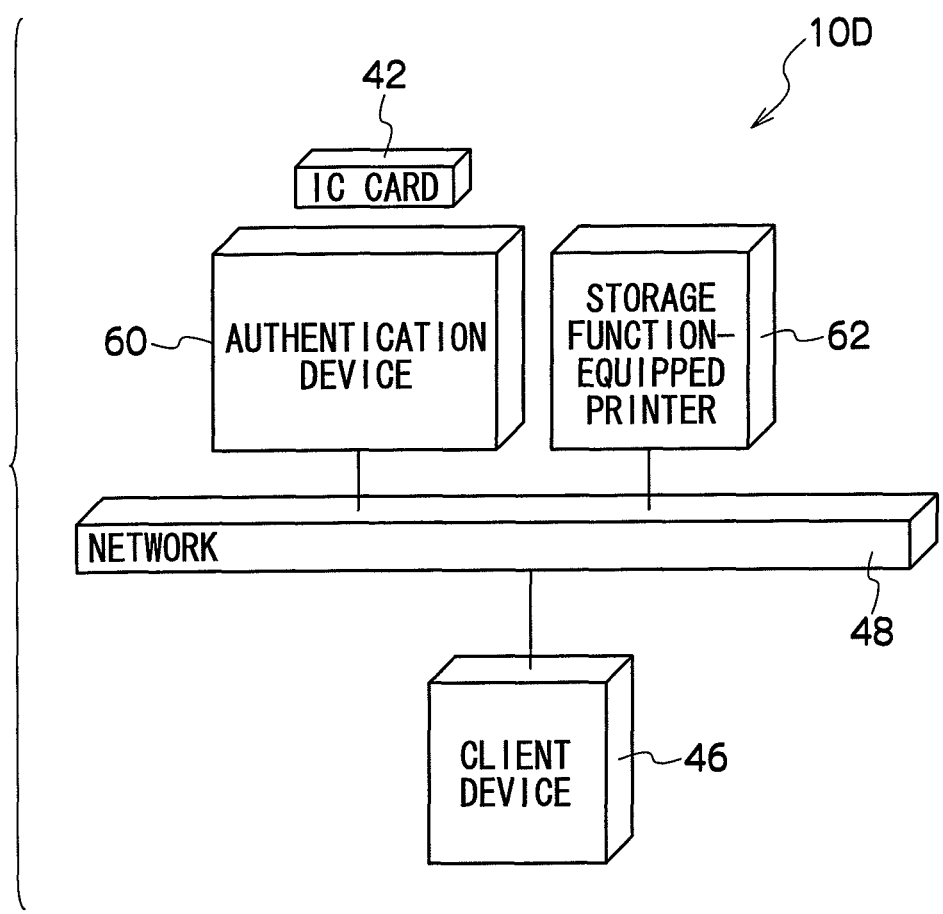
FIG. 18 is a schematic diagram showing structure of a system relating to a third exemplary embodiment.

FIG. 18 is a schematic view showing structure of a system 10D relating to the third exemplary embodiment. Herebelow, structural elements that are the same as in FIG. 12 are assigned the same reference numerals as in FIG. 12 and descriptions thereof will not be given.

As shown in FIG. 18, the system 10D differs from the system 10B of the second exemplary embodiment only in that: an authentication device 60 is employed instead of the card reader 44B and the authentication server 54; and a storage function-equipped printer 62 is employed instead of the printer 50 and the print server 52.

The authentication device 60 has a reading function, for reading the possessor identification information recorded at the IC card 42, a storage function, for storing possessor identification information and inputter identification information, and an authentication function, for performing authentication of the possessor identification information read by the above-mentioned reading function. The storage function-equipped printer 62 has a function for storing image information and a function for forming images represented by the stored image information. The client device 46, the authentication device 60 and the storage function-equipped printer 62 are electrically connected via the network 48.

Figure 19:
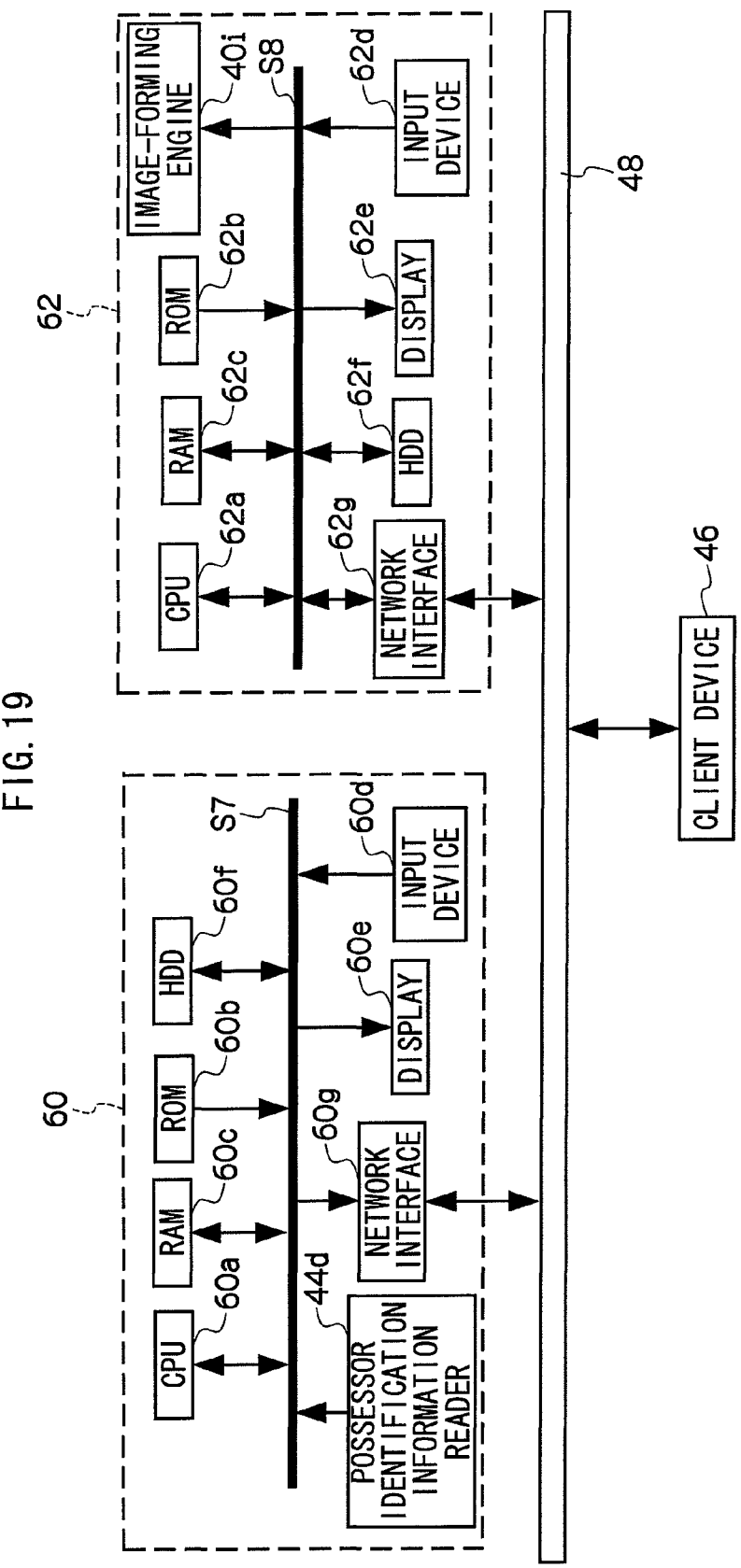
FIG. 19 is a block diagram showing principal structures of an electronic system of the system relating to the third exemplary embodiment.

FIG. 19 is a block diagram showing principal structures of an electrical system of the system 10D relating to the third exemplary embodiment. Herebelow, structural elements that are the same as in FIG. 13 will be assigned the same reference numerals and descriptions thereof will not be given.

The authentication device 60 is provided with the possessor identification information reader 44d, a CPU 60a, a ROM 60b, a RAM 60c, an input device 60d, a display 60e, an HDD 60f and a network interface 60g. The CPU 60a administers the authentication device 60 as a whole. The ROM 60b pre-memorizes a control program for controlling operation of the authentication device 60, and various kinds of data and the like. The RAM 60c is used as a work area during execution of various programs and the like. The input device 60d is structured to include a keyboard and a mouse, and inputs various kinds of information. The display 60e displays various kinds of information. The network interface 60g is connected to the network 48 and administers exchanges of various kinds of information with external devices when communications are being carried out with the external devices via the network 48. These sections are electrically connected via a system bus S7.

The storage function-equipped printer 62 is provided with the image-forming engine 40i, a CPU 62a, a ROM 62b, a RAM 62c, an input device 62d, a display 62e, an HDD 62f and a network interface 62g. The CPU 62a administers the storage function-equipped printer 62 as a whole. The ROM 62b pre-memorizes a control program for controlling operation of the storage function-equipped printer 62, and various kinds of data and the like. The RAM 62c is used as a work area during execution of various programs and the like. The input device 62d is structured to include a keyboard and a mouse, and inputs various kinds of information. The display 62e displays various kinds of information. The network interface 62g is connected to the network 48 and administers exchanges of various kinds of information with external devices when communications are being carried out with the external devices via the network 48. These sections are electrically connected via a system bus S8.

In this third exemplary embodiment, the image-forming engine 40i corresponds to the image forming device 12 and the display 28; the IC card 42 corresponds to the recording medium 14; the authentication device 60 corresponds to the reading device 16; the client device 46 corresponds to the image formation instruction device 18; the HDD 60f corresponds to the memory device 20; the storage function-equipped printer 62 corresponds to the information retention device 22; the CPU 60a corresponds to the determination section 24 and the registration section 30; the CPU 62a corresponds to the image formation section 26; the input device 46d corresponds to the input section 32; the CPU 46a corresponds to the transmission section 34; the CPU 62a corresponds to the reception section 36; and the HDD 62f corresponds to the memory 38.

Next, operation of the system 10D will be described. Operation of the client device 46 of the system 10D is the same as operation of the client device 46 described for the first exemplary embodiment and therefore will not be described here, except in the following respects: instead of a code being transmitted to the storage function-equipped printer 40 together with inputter identification information, a code is transmitted to the authentication device 60 together with inputter identification information; and instead of image information being transmitted to the storage function-equipped printer 40 together with inputter identification information, image information is transmitted to the storage function-equipped printer 62 together with inputter identification information.

Figure 20:
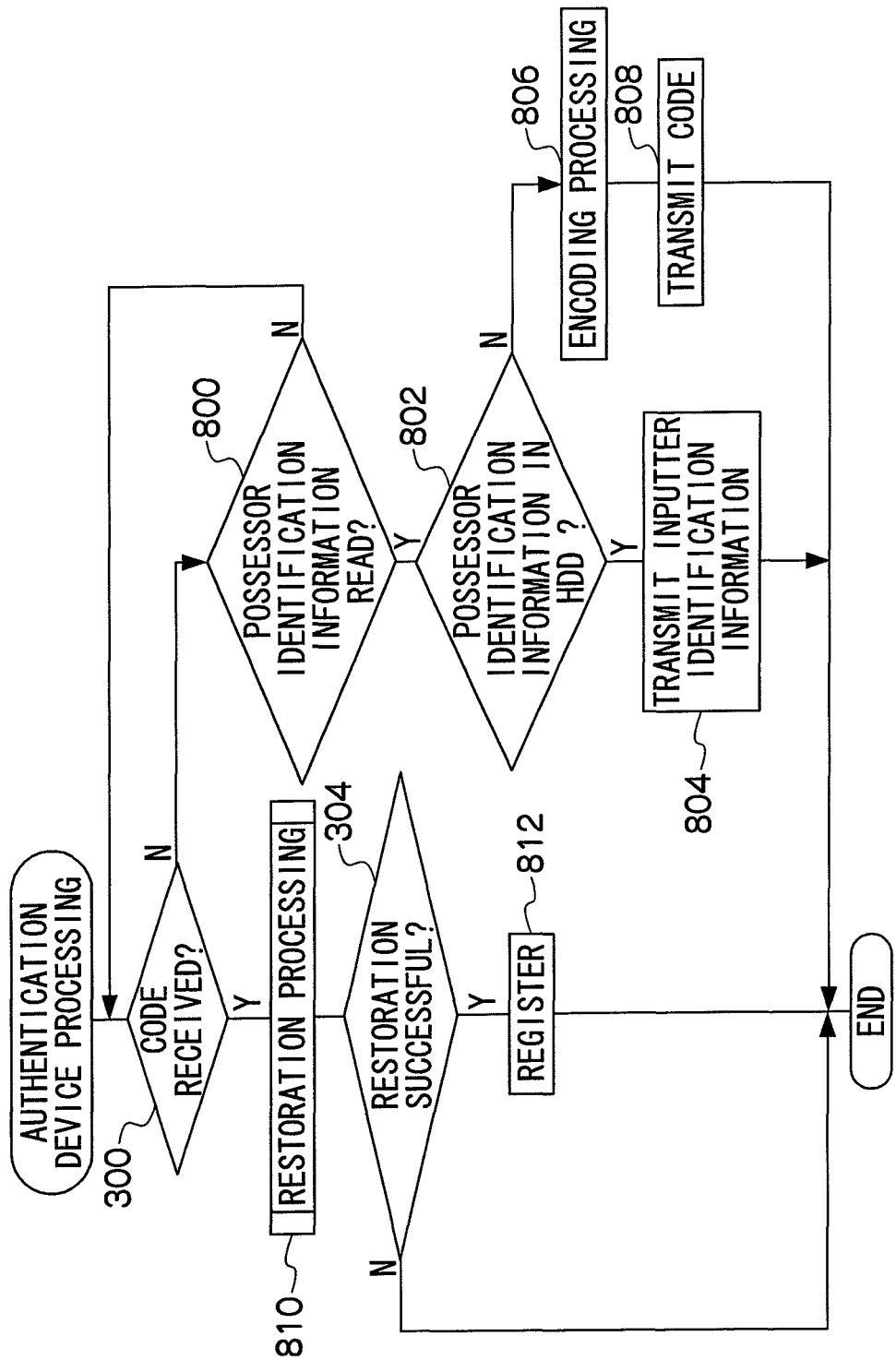
FIG. 20 is a flowchart showing a flow of processing of an authentication device processing program relating to the third exemplary embodiment.

First, operation of the authentication device 60 of the system 10D will be described with reference to FIG. 20. FIG. 20 is a flowchart showing a flow of processing of an authentication device processing program that is executed by the CPU 60a of the authentication device 60 when the authentication device 60 is activated. This program is pre-memorized at a predetermined region of the ROM 60b. Steps in FIG. 20 that perform processing the same as in the program illustrated in FIG. 14 are assigned the same step numbers as in FIG. 14 and descriptions thereof will not be given.

Compared with the authentication server processing program described above for the second exemplary embodiment, the authentication device processing program differs only in that: the processing of a step 800 is applied instead of the processing of step 500; the processing of a step 802 is applied instead of the processing of step 502; the processing of a step 804 is applied instead of the processing of step 504; the processing of a step 806 is applied instead of the processing of step 506; the processing of a step 808 is applied instead of the processing of step 508; the processing of a step 810 is applied instead of the processing of step 510; and the processing of a step 812 is applied instead of the processing of step 512.

In step 800, it is determined whether or not the possessor identification information reader 44d has read possessor identification information. If this determination is positive, the processing advances to step 802, and if the determination is negative, the processing returns to step 300.

In step 802, it is determined whether or not possessor identification information has been memorized in the HDD 60f that is the same as the possessor identification information that has been read by the possessor identification information reader 44d according to the processing of step 800. If this determination is positive, the processing advances to step 804. On the other hand, if the determination is negative, the processing advances to step 806.

In step 804, inputter identification information that is associated with the possessor identification information that is the same as the possessor identification information that has been read by the possessor identification information reader 44d according to the processing of step 800 is read from the HDD 60f, and the inputter identification information that is read is transmitted to the storage function-equipped printer 62. Then the authentication device processing program ends.

In step 806, the earlier-described encoding processing is applied to the possessor identification information that has been read by the possessor identification information reader 44d according to the processing of step 800.

Compared with the encoding processing described for the first exemplary embodiment, the encoding processing relating to the third exemplary embodiment differs only in that: authentication device identification information for identifying the authentication device 60 is employed instead of printer identification information; and authentication time information representing a date and time at which the authentication device 60 reads the possessor identification information from the IC card 42 is employed instead of current time information representing a date/time at which the storage function-equipped printer 40 receives possessor identification information from the card reader 44A.

Next, in step 808, the code generated by the encoding processing of step 806 is transmitted to the storage function-equipped printer 62. Then the authentication device processing program ends.

Alternatively, in step 810, a restoration processing routine program relating to the third exemplary embodiment is executed.

Compared with the restoration processing routine program described for the second exemplary embodiment, the restoration processing routine program relating to the third exemplary embodiment differs only in the following respects: in step 402, instead of processing for restoring a code to possessor identification information, authentication server identification information and reception time information, processing for restoring a code to possessor identification information, authentication device identification information and authentication time information is employed; in step 404, instead of processing for determining whether or not the authentication server identification information restored by the processing of step 402 matches authentication server identification information held by the authentication server 54, processing for determining whether or not the authentication device identification information restored by the processing of step 402 matches authentication device identification information held by the authentication device 60 is employed; and in step 406, instead of processing for determining whether or not an amount of time that has passed since a date/time represented by the reception time information restored by the processing of step 402 is less than a pre-specified duration, processing for determining whether or not an amount of time that has passed since a date/time represented by the authentication time information restored by the processing step 402 is less than a pre-specified duration is employed.

Hence, in step 812, the possessor identification information extracted by the processing of step 810 and the inputter identification information received together with the code according to the processing of step 300 are registered by being memorized in association at the HDD 60f. Thereafter, the authentication device processing program ends.

Next, operation of the storage function-equipped printer 62 of the system 10D will be described with reference to FIG. 21. FIG. 21 is a flowchart showing a flow of processing of a storage function-equipped printer processing program that is executed by the CPU 62a of the storage function-equipped printer 62 when the storage function-equipped printer 62 is activated. This program is pre-memorized at a predetermined region of the ROM 62b.

Firstly, in step 900, it is determined whether or not a code transmitted by the processing of step 808 of the above-described authentication device processing program has been received. If this determination is positive, the processing advances to step 902. On the other hand, if the determination is negative, the processing advances to step 904.

In step 902, the image-forming engine 40i is caused to display the code received according to the processing of step 900, by image formation on a recording paper. Then the storage function-equipped printer processing program ends.

In this third exemplary embodiment, the processing of the above-described step 902 is to cause the image-forming engine 40i to display, by image formation on a recording paper, the code received according to the processing of step 900 and an expiration time until the possessor identification information obtained by restoration of the code will be registered by memorization at the HDD 60f.

Further, in the third exemplary embodiment, at the earlier-mentioned code input screen, a code that is displayed by the above-described step 902 is inputted through the input device 46d.

Alternatively, in step 904, it is determined whether or not image information has been received together with inputter identification information. If this determination is positive, the processing advances to step 906. Information corresponding to the image information and the inputter identification information that have been received according to the processing of step 904 are memorized in association with one another in the HDD 62f. Then the storage function-equipped printer processing program ends.

If the determination of step 904 is negative, the processing advances to step 908, and it is determined whether or not inputter identification alone has been received. If this determination is positive, the processing advances to step 910, and if the determination is negative, the processing returns to step 900.

In step 910, it is determined whether or not image information has been memorized in the HDD 62f that is associated with the inputter identification information that has been received according to step 908. If this determination is negative, the storage function-equipped printer processing program ends. However, if the determination is positive, the processing advances to step 912, the image information is read from the HDD 62f, and the image-forming engine 40i is caused to execute image formation in accordance with the image information.

For this third exemplary embodiment, a description has been given for an example in which the possessor identification information is encoded at the authentication device 60. However, the possessor identification information may be encoded at the storage function-equipped printer 62.

Hereabove, the present invention has been described using the above-described exemplary embodiments. However, the technological scope of the present invention is not to be limited to the scope described by the above exemplary embodiments. Numerous modifications and improvements may be applied to the above exemplary embodiments within a scope not departing from the spirit of the present invention, and modes to which modifications and/or improvements have been applied are to be included in the technological scope of the present invention.

Moreover, the above exemplary embodiments are not limiting to the invention described in the claims, and not all of the combinations of characteristics described in the above exemplary embodiments are necessarily required for a resolution of the invention. Inventions with various stages of the above exemplary embodiments are to be included, and various inventions can be derived by combining the plural structural conditions that are disclosed in accordance with circumstances. Even if some structural element is removed from the totality of structural elements illustrated in the above exemplary embodiments, as long as the effect thereof is provided, a structure from which the some structural element has been removed may be derived to serve as the invention.

For example, the structures of the systems 10A to 10D described for the above exemplary embodiments (see FIG. 2, FIG. 3, FIG. 12, FIG. 13, and FIG. 17 to FIG. 19) are examples, and obviously may be altered in accordance with circumstances within a scope not departing from the spirit of the present invention.

Further, the flows of processing of the various processing programs described for the above exemplary embodiments (see FIG. 6, FIG. 7, FIG. 9, FIG. 10, FIG. 14 to FIG. 16, FIG. 20 and FIG. 21) are examples, and obviously, within a scope not departing from the spirit of the present invention, unnecessary steps may be removed, new steps may be added, and processing sequences may be rearranged.

Further, in the above exemplary embodiments, cases have been described in which the card reader processing, the client device processing, the storage function-equipped printer processing, the restoration processing, the authentication server processing, the print server processing, the printer processing and the authentication device processing are realized by software structures. However, the present invention is not limited thus. For example, these processes may be realized by hardware structures. As an example of such a case, a mode may be exemplified in which functional devices are prepared and used to implement processing the same as, for example, the functional blocks of the system 10 illustrated in FIG. 1 (the determination section 24, the image formation section 26, the registration section 30, the input section 32, the transmission section 34 and the reception section 36).

Further, for the above exemplary embodiments, descriptions have been given of examples in which the image-forming engine 40*i* is caused to display a code by image formation on a recording paper. However, the present invention is not limited thus, and a code may be aurally presented. Further, a code may be displayed by a display such as an LCD (liquid crystal display) or the like. Further yet, a code may be transmitted to a predetermined personal computer using e-mail and the code may be displayed at a display which is provided at the personal computer.

Further, for the above exemplary embodiments, descriptions have been given of examples in which a code is displayed as is. However, the present invention is not limited thus; a code may be converted to a QR code for display.

Further, for the above exemplary embodiments, descriptions have been given of examples in which possessor identification information is encoded. However, the present invention is not limited thus; possessor identification information may be left unencoded. In such a case, the possessor identification information is displayed by the display 28, and the possessor identification information is inputted through the input section 32.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. An information registration system comprising:
   an image forming device that prints an image represented by image information;
   a recording medium at which possessor identification information for identifying a person who possesses the recording medium is pre-recorded;
   a recording medium reading device that reads the possessor identification information from the recording medium;
   an image formation instruction device comprising:
      an input section that inputs transmission instruction information, which instructs a transmission of the image information representing the image that is to be printed by the image forming device, and the possessor identification information, and
      a transmission section that, when the transmission instruction information is inputted through the input section, transmits the image information together with inputter identification information for identifying a person who inputs information;
   a memory device that stores, in association, the possessor identification information recorded at the recording medium, which is carried by an authorized user who is authorized to use the image forming device, and the inputter identification information that corresponds to the possessor identification information;
   an information retention device comprising:
      a reception section that receives the image information and the inputter identification information transmitted by the transmission section, and
      a memory that temporarily stores the image information and the corresponding inputter identification information received by the reception section in association with one another;
   a determination section that determines whether or not the possessor identification information read by the recording medium reading device has been stored at the memory device;
   an image formation section that, in response to a determination by the determination section that the possessor identification information has been stored at the memory device, reads from the memory the image information that is associated with the inputter identification information that is associated in the memory device with the possessor identification information, and performs printing by the image forming device in accordance with the image information;

an output section that, in response to a determination by the determination section that the possessor identification information has not been stored at the memory device, causes the image forming device to print the possessor identification information on a sheet of paper; and a registration section that, when the possessor identification information is inputted through the input section, registers the possessor identification information and the inputter identification information by storing the possessor identification information and the inputter identification information in association at the memory device.

2. The information registration system of claim 1, further comprising:

an encoding section that, in response to a determination by the determination section that the possessor identification information has not been stored at the memory device, encodes the possessor identification information; and a restoration section that restores the possessor identification information which has been encoded by the encoding section to an original state, wherein:

the output section outputs the possessor identification information that has been encoded by the encoding section, and the registration section registers the possessor identification information and the inputter identification information that corresponds to the possessor identification information by storing the possessor identification information that has been restored to the original state by the restoration section and the inputter identification information in association at the memory device.

3. The information registration system of claim 2, wherein the possessor identification information that is inputted at the input section includes the encoded possessor identification information that has been outputted by the output section.

4. The information registration system of claim 1, wherein the recording medium comprises an IC card, and the recording medium reading device comprises an IC card reader.

5. The information registration system of claim 4, wherein the IC card comprises an RFID tag, and the recording medium reading device comprises an RFID reader.

6. The information registration system of claim 1, wherein the recording medium comprises a magnetic card, and the recording medium reading device comprises a magnetic card reader.

7. The information registration system of claim 1, wherein a fingerprint is recorded at the recording medium, the recording medium reading device reads the fingerprint, and the possessor identification information comprises fingerprint information representing a characteristic of the fingerprint.

8. The information registration system of claim 1, wherein the inputter identification information comprises a login name at the image formation instruction device of the inputter.

9. The information registration system of claim 1, wherein the output section outputs, with the possessor identification information, a registration expiration time for registration of the possessor identification information by the registration section.

10. The information registration system according to claim 1, wherein:

a printer comprises the image forming device, the image formation section, the output section, and the registration section; and the image formation instruction device is a client computer.

11. An information registration system comprising:

a recording medium at which possessor identification information for identifying a person who possesses the recording medium is pre-recorded;

a recording medium reading device that reads the possessor identification information from the recording medium;

an image formation instruction device comprising:

an input section that inputs transmission instruction information, which instructs a transmission of image information representing an image that is to be formed by an image forming device, and encoded possessor identification information, and a transmission section that, when the transmission instruction information is inputted through the input section, transmits the image information together with inputter identification information for identifying a person who inputs information;

an information retention device comprising:

a reception section that receives the image information and the inputter identification information transmitted by the transmission section, and a memory that temporarily stores, in association, the image information and the corresponding inputter identification information received by the reception section;

an authentication server comprising:

a memory device that stores, in association, the possessor identification information recorded at the recording medium, which is possessed by an authorized user who is authorized to use the image forming device, and the inputter identification information that corresponds to the possessor identification information, a determination section that determines whether or not the possessor identification information read by the recording medium reading device has been stored at the memory device, an encoding section that, in response to the determination section determining that the possessor identification information has not been stored at the memory device, encodes the possessor identification information, a restoration section that restores the possessor identification information which has been encoded by the encoding section to an original state, and a registration section that, when the encoded possessor identification information is inputted at the input section, registers the possessor identification information and the inputter identification information that corresponds to the possessor identification information by storing the possessor identification information that has been restored to the original state by the restoration section and the inputter identification information in association at the memory device; and a printer comprising:

the image forming device, which prints the image represented by the image information, an image formation section that, in response to the determination section determining that the possessor identification information has been stored at the memory device, reads from the memory the image information that is associated with the inputter identification information that is associated in the memory device with the possessor identification information, and implements printing by the image forming device in accordance with the image information, and an output section that, in response to the determination section determining that the possessor identification information has not been stored at the memory device, causes the image forming device to print the encoded possessor identification information which has been encoded by the encoding section on a sheet of paper.

12. The information registration system of claim 11, wherein the encoding section encodes the possessor identification information in accordance with authentication server identification information, which identifies the authentication server, and reception time information, which represents a date and time at which the authentication server receives the possessor identification information from the recording medium reading device, the restoration section restores the possessor identification information, the authentication server identification information and the reception time information to an original state, and in response to the authentication server identification information matching authentication server identification information of the registration section and an amount of time that has passed since the date and time represented by the reception time information is within a predetermined duration, the registration section stores the possessor identification information and the inputter identification information corresponding to the possessor identification information in association at the memory device.

13. The information registration system of claim 11, wherein the recording medium reading device and the authentication server are integrally structured to serve as an authentication device, the information retention device and the printer are integrally structured to serve as a printer with a storage function, the encoding section encodes the possessor identification information in accordance with authentication device identification information, which identifies the authentication device, and authentication time information, which represents a date and time at which the recording medium reading device of the authentication device reads the possessor identification information, the restoration section restores the possessor identification information, the authentication device identification information and the authentication time information to an original state, and in response to the authentication device identification information matching authentication device identification information of the registration section and an amount of time that has passed since the date and time represented by the authentication time information is within a predetermined duration, the registration section stores the possessor identification information and the inputter identification information corresponding to the possessor identification information in association at the memory device.

14. The information registration system of claim 11, wherein the authentication server, the information retention device and the printer are integrally structured to serve as a printer with a storage function, the encoding section encodes the possessor identification information in accordance with printer identification information, which identifies the printer with the storage function, and reception time information, which represents a date and time at which the printer with the storage function receives the possessor identification information from the recording medium reading device, the restoration section restores the possessor identification information, the printer identification information and the reception time information to an original state, and in response to the printer identification information matching printer identification information of the registration section and an amount of time that has passed from the reception time information is within a predetermined duration, the registration section stores the possessor identification information and the inputter identification information corresponding to the possessor identification information in association at the memory device.

* * * * *